US012549639B2

(12) United States Patent
Schuller et al.

(10) Patent No.: US 12,549,639 B2
(45) Date of Patent: Feb. 10, 2026

(54) REMOTE NETWORK MANAGEMENT INFRASTRUCTURE FOR CLOUD-BASED DEPLOYMENTS

(71) Applicant: ServiceNow, Inc., Santa Clara, CA (US)

(72) Inventors: William Joseph Schuller, Frisco, TX (US); Jude Ian McQuaid, San Diego, CA (US); Antony Chan, Pasadena, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/495,245

(22) Filed: Oct. 26, 2023

(65) Prior Publication Data

US 2024/0056507 A1 Feb. 15, 2024

Related U.S. Application Data

(63) Continuation of application No. 17/651,018, filed on Feb. 14, 2022, now Pat. No. 11,838,374.

(60) Provisional application No. 63/148,686, filed on Feb. 12, 2021.

(51) Int. Cl.
*G06F 15/16* (2006.01)
*H04L 67/00* (2022.01)

(52) U.S. Cl.
CPC .................................... *H04L 67/34* (2013.01)

(58) Field of Classification Search
CPC ...................................................... H04L 67/34
See application file for complete search history.

(56) References Cited

U.S. PATENT DOCUMENTS

| | | | |
|---|---|---|---|
| 6,321,229 | B1 | 11/2001 | Goldman |
| 6,609,122 | B1 | 8/2003 | Ensor |
| 6,799,189 | B2 | 9/2004 | Huxoll |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |
| 7,028,301 | B2 | 4/2006 | Ding |
| 7,062,683 | B2 | 6/2006 | Warbenburg |
| 7,131,037 | B1 | 10/2006 | LeFaive |
| 7,170,864 | B2 | 1/2007 | Matharu |
| 7,350,209 | B2 | 3/2008 | Shum |
| 7,392,300 | B2 | 6/2008 | Anantharangachar |
| 7,610,512 | B2 | 10/2009 | Gerber |

(Continued)

*Primary Examiner* — Normin Abedin
(74) *Attorney, Agent, or Firm* — FLETCHER YODER PC

(57) ABSTRACT

A software architecture within a public cloud network may include units of: (i) a plurality of computational instances respectively related to managed networks, (ii) a plurality of servers configurable as load simulators, (iii) administrative components configured to deploy and update the software architecture, and (iv) shared infrastructure services, wherein the units of the software architecture are implemented on virtual machines of the public cloud network and are connected to but logically isolated from one another by way of different access controls or policies. A provider network, coupled to the software architecture by way of network gateways within the shared infrastructure services, may be configured to deliver the configuration, software packages, and database schema to the infrastructure-as-code platform.

20 Claims, 19 Drawing Sheets

(56) References Cited

U.S. PATENT DOCUMENTS

| | | | |
|---|---|---|---|
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 8/2016 | Kowalski | |
| 9,467,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 2015/0301849 A1 | 10/2015 | Du et al. | |
| 2019/0097973 A1* | 3/2019 | Adler | H04L 63/1425 |
| 2019/0306242 A1* | 10/2019 | Thummalapalli | H04L 41/0806 |
| 2020/0099659 A1* | 3/2020 | Cometto | H04L 67/1001 |
| 2020/0314191 A1 | 10/2020 | Madhavan et al. | |
| 2020/0329464 A1 | 10/2020 | Sampath et al. | |
| 2020/0358859 A1* | 11/2020 | Gupta | H04L 67/148 |

* cited by examiner

670

```
variable "prefix" {
  default = "tfvmex"
}

resource "azurerm_resource_group" "main" {
  name     = "${var.prefix}-resources"
  location = "West US"
}

resource "azurerm_virtual_network" "main" {
  name                = "${var.prefix}-network"
  address_space       = ["10.0.0.0/16"]
  location            = "${azurerm_resource_group.main.location}"
  resource_group_name = "${azurerm_resource_group.main.name}"
}

resource "azurerm_subnet" "internal" {
  name                 = "internal"
  resource_group_name  = "${azurerm_resource_group.main.name}"
  virtual_network_name = "${azurerm_virtual_network.main.name}"
  address_prefix       = "10.0.2.0/24"
}

resource "azurerm_network_interface" "main" {
  name                = "${var.prefix}-nic"
  location            = "${azurerm_resource_group.main.location}"
  resource_group_name = "${azurerm_resource_group.main.name}"

  ip_configuration {
    name                          = "testconfiguration1"
    subnet_id                     = "${azurerm_subnet.internal.id}"
    private_ip_address_allocation = "Dynamic"
  }
}

resource "azurerm_virtual_machine" "main" {
  name                  = "${var.prefix}-vm"
  location              = "${azurerm_resource_group.main.location}"
  resource_group_name   = "${azurerm_resource_group.main.name}"
  network_interface_ids = ["${azurerm_network_interface.main.id}"]
  vm_size               = "Standard_DS1_v2"
```

FIG. 6E

REMOTE NETWORK MANAGEMENT INFRASTRUCTURE FOR CLOUD-BASED DEPLOYMENTS

CROSS-REFERENCE TO RELATED APPLICATION

This application is a continuation of U.S. application Ser. No. 17/651,018, filed Feb. 14, 2022, which claims priority to U.S. Provisional Application No. 63/148,686, filed Feb. 12, 2021, each of which is hereby incorporated by reference in its entirety.

BACKGROUND

To expand its operations, a remote network management platform may host its services on one or more computing resources (e.g., databases, virtual machines, software applications, and/or other resources) provided by a public cloud network. Because the public cloud network supplies the hardware and much of the software necessary to operate these computing resources, an operator of the remote network management platform may not have to devote time to provision or deploy its own infrastructure to host the services and instead can focus on building new services for its users or upgrading existing services.

SUMMARY

The embodiments herein provide three example deployments of remote network management functionality in a public cloud network. The first is an isolated full-stack deployment that is self-contained within the public cloud network, and employs a quarantine system for approval of updates to its configuration, software, or database schema. The second is a full-stack deployment that positions certain global infrastructure services in a provider network rather than the public cloud network, and omits the quarantine system. The third is a hybrid deployment that positions virtually all infrastructure services in the provider network rather than the public cloud network, and also omits the quarantine system.

Accordingly, a first example embodiment may involve a software architecture within a public cloud network, the software architecture including units of: (i) a plurality of computational instances respectively related to managed networks, (ii) a plurality of servers configurable as load simulators, (iii) administrative components configured to deploy and update the software architecture, and (iv) shared infrastructure services. The units of the software architecture are implemented on virtual machines of the public cloud network and are connected to but logically isolated from one another by way of different access controls or policies. The plurality of computational instances are configured to respectively provide operational and administrative services to the managed networks. The load simulators when configured mimic an arrangement of a particular computational instance from the plurality of computational instances and replay network traffic captured from the particular computational instance. The administrative components include an infrastructure-as-code platform containing a template representation of a configuration, software packages, and database schema of the software architecture according to which the virtual machines are configured. The shared infrastructure services include network gateways connecting the software architecture to one or more other networks. A provider network, coupled to the software architecture by way of the network gateways, may be configured to deliver the configuration, software packages, and database schema to the infrastructure-as-code platform.

A second example embodiment may involve automatically deploying, within a public cloud network, a plurality of computational instances respectively related to managed networks as part of a software architecture, wherein the plurality of computational instances are configured to respectively provide operational and administrative services to the managed networks, and wherein the software architecture is implemented on virtual machines of the public cloud network that are connected to but logically isolated from one another by way of different access controls or policies. The second example embodiment may also involve automatically deploying, within the public cloud network, a plurality of servers configurable as load simulators, wherein the load simulators when configured mimic an arrangement of a particular computational instance from the plurality of computational instances and replay network traffic captured from the particular computational instance. The second example embodiment may also involve automatically deploying, within the public cloud network, administrative components configured to deploy and update the software architecture, wherein the administrative components include an infrastructure-as-code platform containing a template representation of a configuration, software packages, and database schema of the software architecture according to which the virtual machines are arranged. The second example embodiment may also involve automatically deploying, within the public cloud network, shared infrastructure services, wherein the shared infrastructure services include network gateways connecting the software architecture to a provider network, and wherein the provider network is coupled to the software architecture by way of the network gateways and configured to deliver the configuration, software packages, and database schema to the infrastructure-as-code platform.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6E depicts a partial template representation of a cloud-based implementation of a remote network management platform, in accordance with example embodiments.

DETAILED DESCRIPTION

Figure 1:
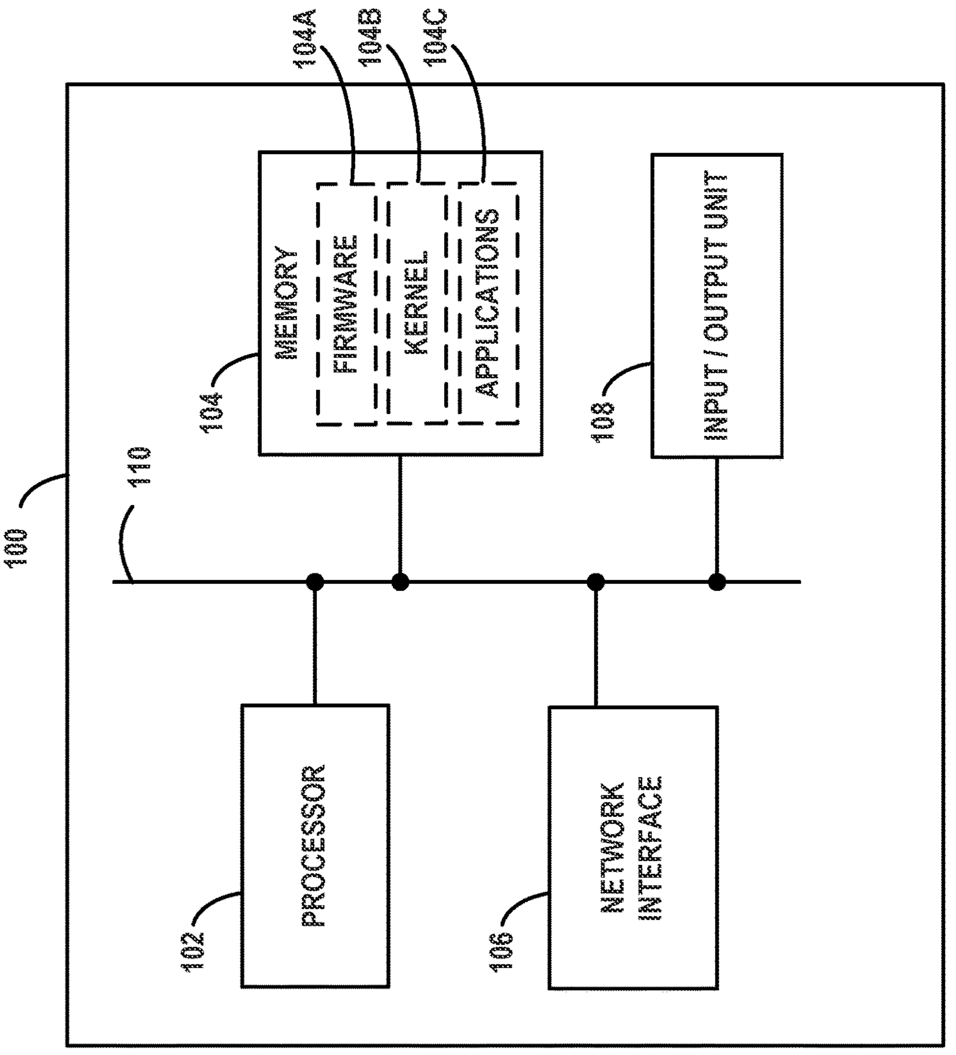
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML, and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
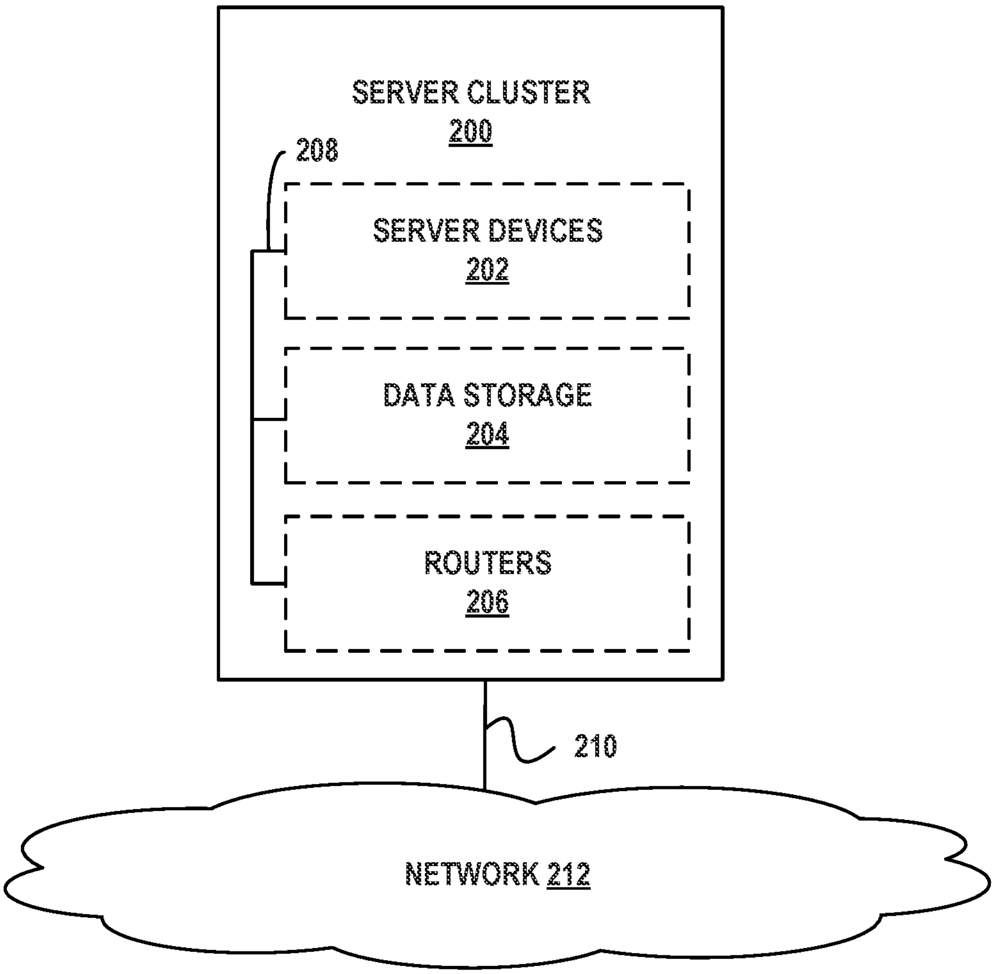
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
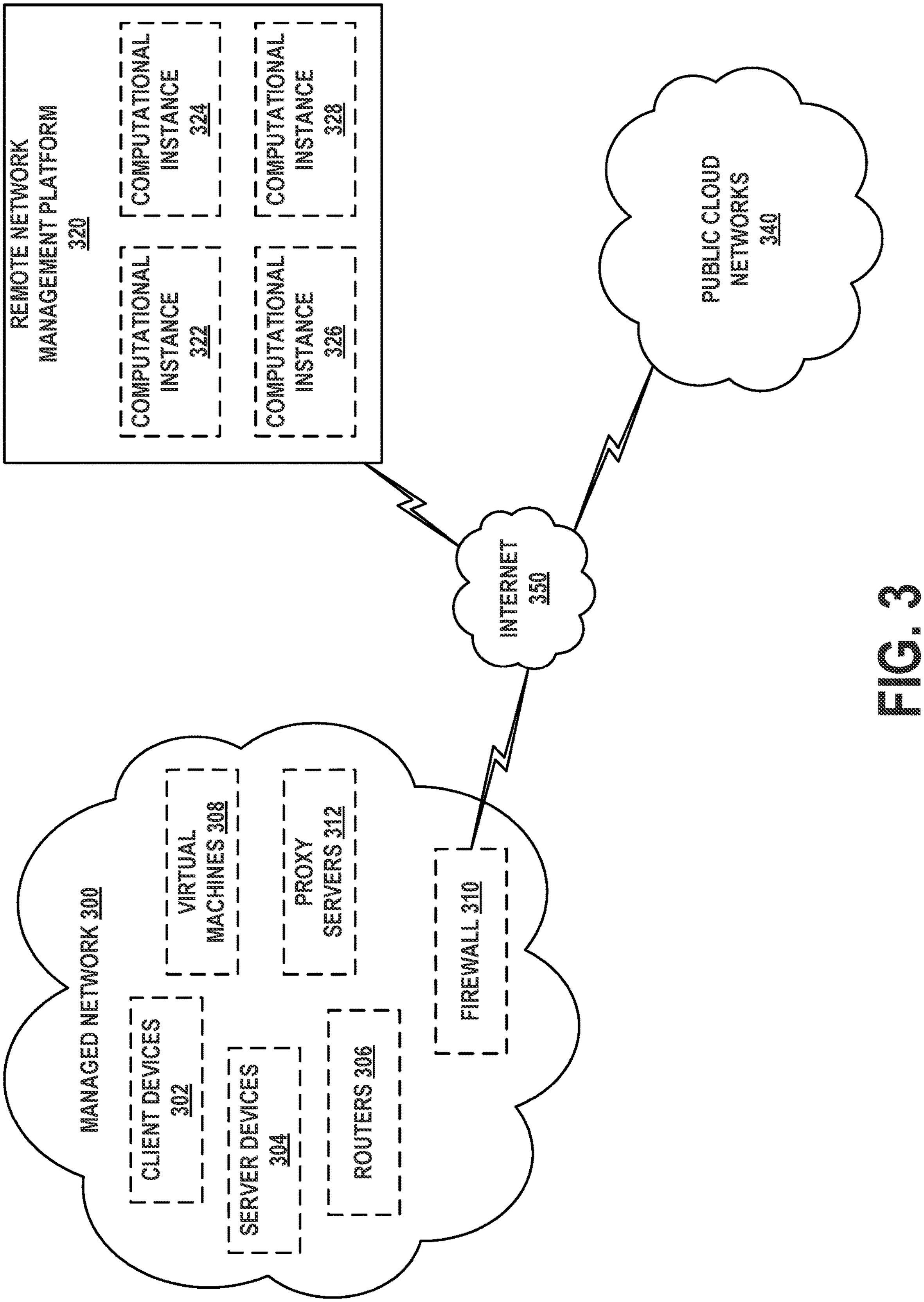
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
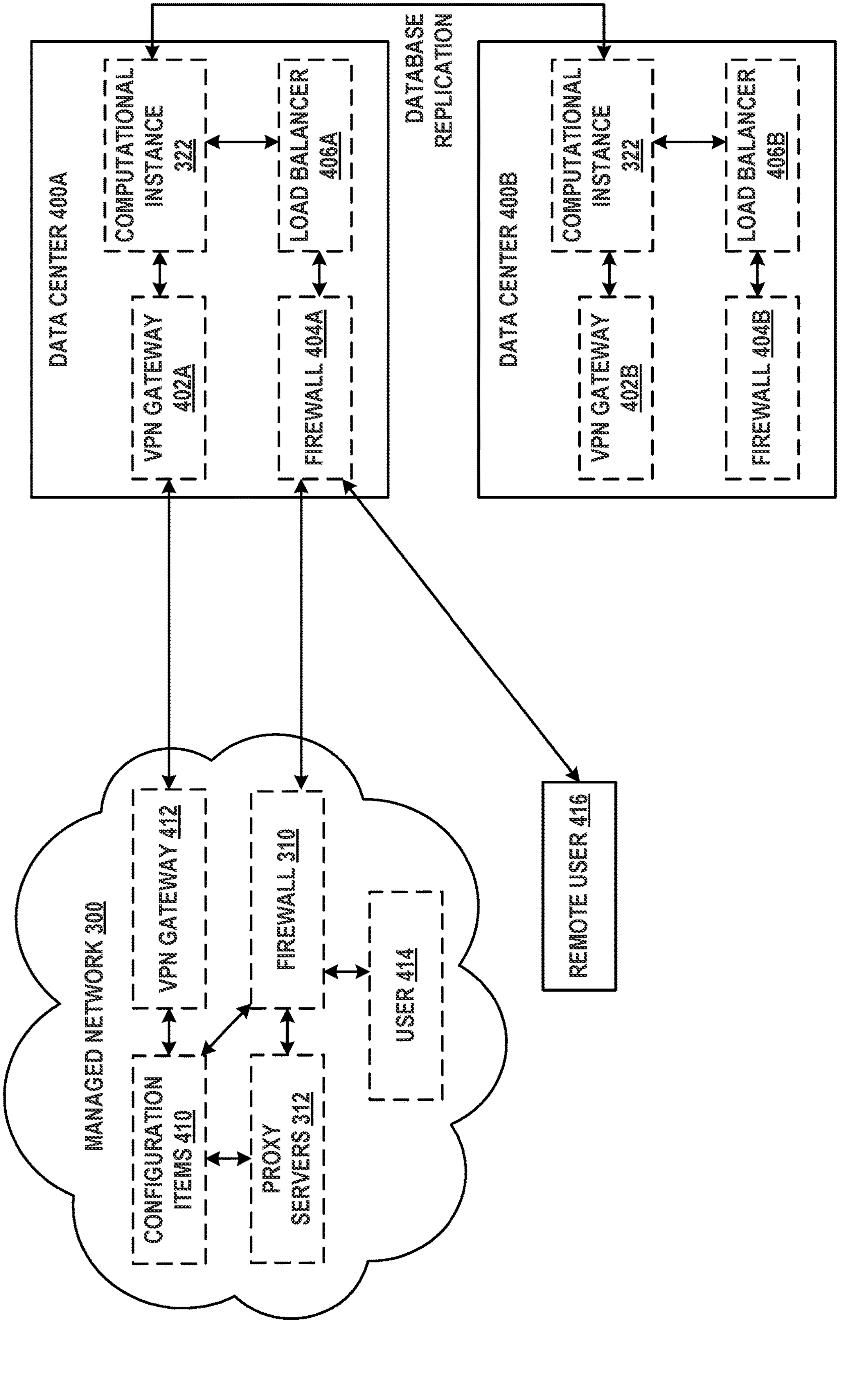
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual machines that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
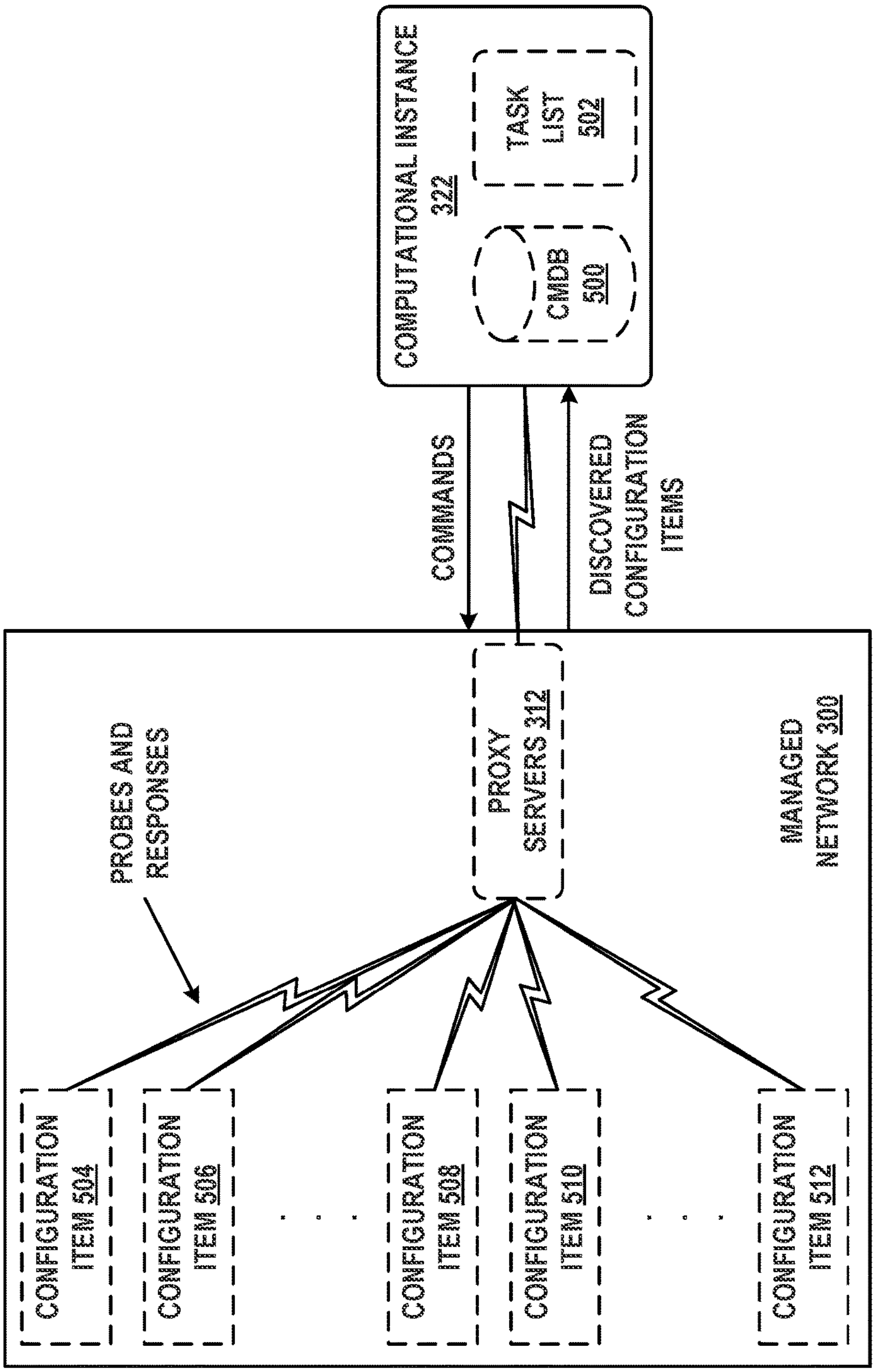
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
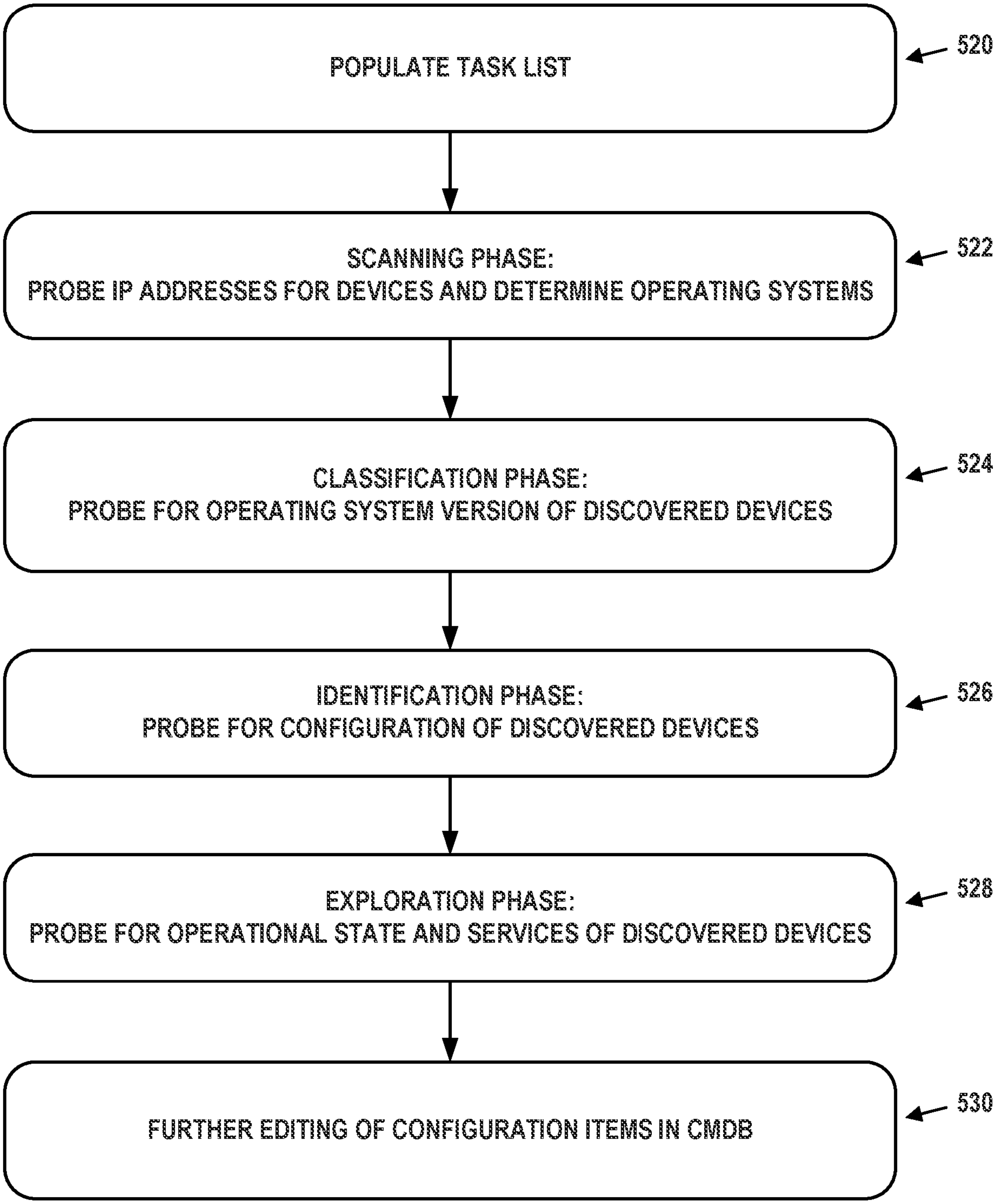
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual machines, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Public Cloud Implementation of a Remote Network Management Platform

Traditionally, remote network management platforms were hosted and/or deployed on a hardware and software infrastructure provided by the entity that operates and manages such platforms. These implementations could be in custom data centers, such as data centers 400A and 400B, for example.

However, the operator of a remote network management platform (such as remote network management platform 320) may be interested in hosting the platform on a public cloud network 340. There are certain advantages to doing so, such as the operator not having to maintain the hardware, core software, networking, and connectivity of data centers. Further, certain public cloud vendors have achieved security certifications for their systems that meet governmental and/or military requirements. Thus, by deploying a remote network management platform on such a public cloud network, the operator may be able to serve entities that it otherwise would not be able to serve, without having to seek out and obtain the security certifications these entities require.

In order to leverage these advantages, the operator may have to modify its software architecture to be compatible with that of the public cloud network. This may involve porting software applications, computing clusters, redundancy and load balancing features, and installation and upgrade facilities from the remote network management platform to virtual machines and other infrastructure of the public cloud network. In some cases, modifications of the software and/or its operational characteristics may change significantly between the remote network management platform and the public cloud network.

The embodiments herein describe how remote network management platform 320 can be deployed on a public cloud network. While the embodiments herein focus on the MICROSOFT® AZURE® public cloud architecture as an illustrative example, other public cloud networks (such as AMAZON WEB SERVICES®, GOOGLE® Cloud Platform, and/or ALIBABA CLOUD®) could be used in a similar fashion.

A. Isolated Full-Stack Deployment

FIGS. 6A-6D illustrate what will be referred to herein as an isolated full-stack deployment. Some of the notable characteristics of this deployment is that all of the technology and services required to host a remote network management platform is entirely contained within the public cloud network. Thus, isolated full-stack deployments are good candidates for providing services used by private networks with heightened security requirements (e.g., governmental or military entities).

Deployment 600 consists of a number of logical components distributed across region 602A and region 602B. Each of these regions may be located in a different geographical area, such as different cities or different countries. In some embodiments, both regions may be simultaneously active within approximately 50% of their respective capacities. Thus, about 50% of the processing, storage, and/or networking load on deployment 600 may be distributed to region 602A and about 50% of this load may be distributed to region 602B. Or, put another way, any particular computational instance is operating in only one of the regions and is idle in the other, but about half of all operating instances are located in each region.

Additionally, each region may be embodied across multiple data centers. For example, a region within a busy connectivity hub or large city (e.g., Washington DC) may include three data centers in that city.

Figure 6A:
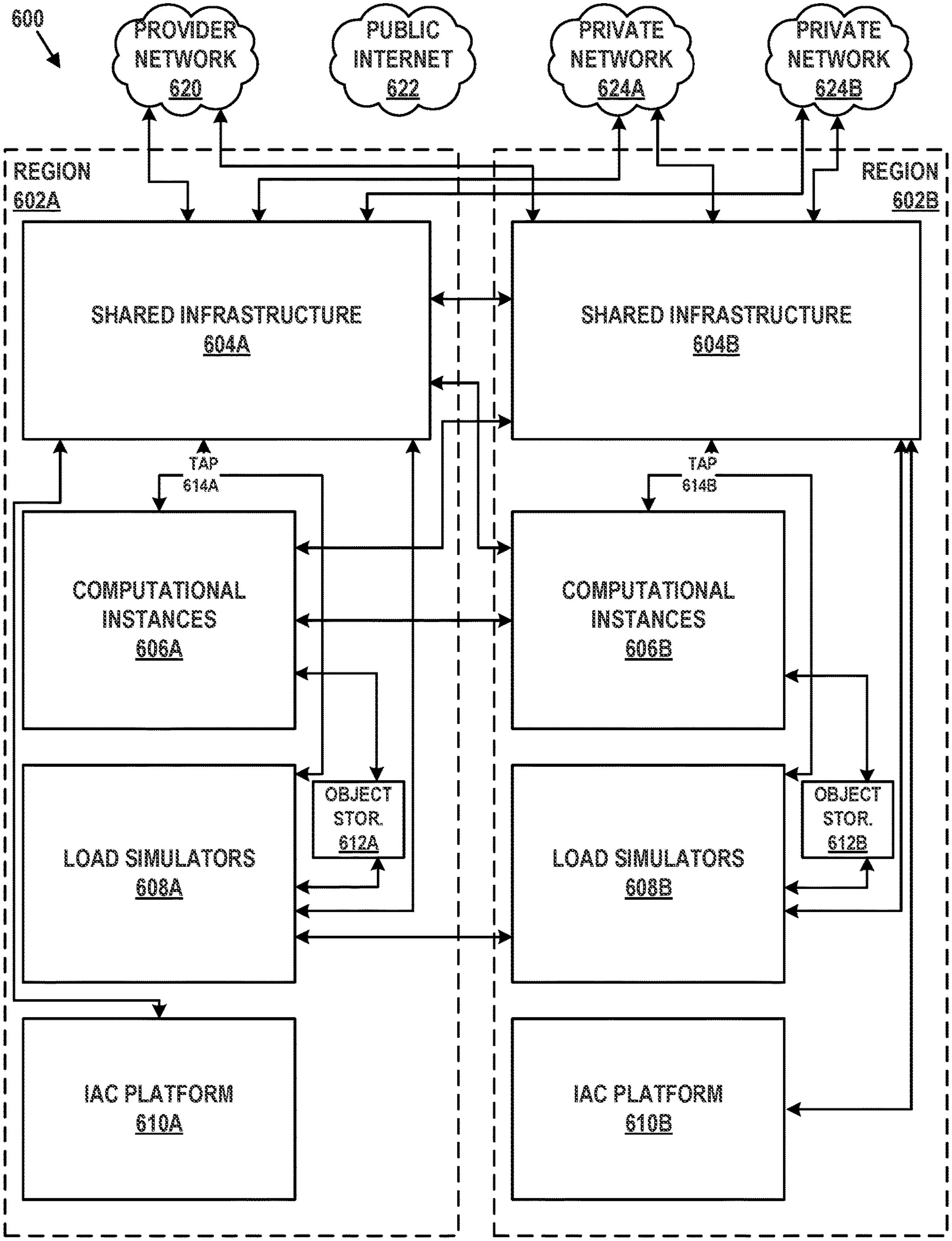
FIG. 6A depicts a cloud-based implementation of a remote network management platform, in accordance with example embodiments.

Both regions in FIG. 6A may contain replicated copies of the same software and data. Thus, if one region becomes inoperable or inaccessible (e.g., due to failure, planned maintenance, or emergency maintenance), the other may take on the additional load. Aside from configurations specific to their physical and/or topological locations, the regions may otherwise be functionally identically.

Region 602A contains shared infrastructure 604A, computational instances 606A, load simulators 608A, infrastructure-as-code (IAC) platform 610A, object storage 612A, and tap 614A. Likewise, region 602B contains shared infrastructure 604B, computational instances 606B, load simulators 608B, IAC platform 610B, object storage 612B, and tap 614B. In some cases, tap 614A and tap 614B may be disposed within shared infrastructure 604A and shared infrastructure 604B, respectively. For sake of simplicity, the description below will focus on the components of region 602A. Nonetheless, the corresponding components of region 602B may have similar functionality.

Each of these components may be implemented using a dedicated virtual local area network (LAN) or a dedicated virtual network (a logical grouping of network segments). Moreover, each pairing of similar components across regions (e.g., shared infrastructure 604A and 604B, computational instances 606A and 606B, load simulators 608A and 608B, and IAC platform 610A and 610B) may be arranged in the same subscription. A subscription may be a logically isolated grouping of components with similar access controls, policies, and security mechanisms. Components within virtual networks can communicate with virtual networks of other subscriptions only through pre-defined channels, and a single virtual network cannot exist in more than one subscription. Thus, by locating different components in different subscriptions, these components are forced to be in different virtual networks. Placing components in subscriptions as shown allows assignment of administrative authorization at the subscription boundary, so that the proper administrative group is restricted to just the components for which it is responsible. In this fashion, user accounts with different levels of permission may be required to access shared infrastructure 604A and 604B, computational instances 606A and 606B, load simulators 608A and 608B, and IAC platform 610A and 610B.

Both regions 602A and 602B may connect to various external networks. For example, FIG. 6A depicts these regions connecting to provider network 620, private network 624A, and private network 624B. These connections may be dedicated lines, trunks, or circuits, for example. Notably, regions 602A and 602B are not shown connecting to public Internet 622, but such connections could exist in some variations. For example, the connections to provider network 620, private network 624A, and private network 624B may be virtual private network connections over public Internet 622.

In these embodiments, provider network 620 may refer to infrastructure of the operator of remote network management platform 320. Thus, the configuration, software packages, and database schema (as well as updates thereto) deployed within region 602A and region 602B may be obtained by way of provider network 620. Private network 624B may refer to one or more military branches of a governmental entity (e.g., a department of defense, army, navy, air force, signal intelligence), while private network 624A may refer to one or more non-military branches of a governmental entity.

In various embodiments, more or fewer provider networks and/or private networks may be accessible from deployment 600. Further, deployment 600 may contain more or fewer regions.

1. Shared Infrastructure

Shared infrastructure 604A contains security mechanisms and shared services that operate on behalf of other components in region 602A, and provide these components with access to provider network 620, private network 624A, and private network 624B. Notably, shared infrastructure 604B has connections to provider network 620, private network 624A, and private network 624B, as well as to computational instances 606A, load simulators 608A, and IAC platform 610A. Shared infrastructure 604A also has connections to shared infrastructure 604B and computational instances 606B for purposes of redundancy, load balancing, and configuration management.

Figure 6B:
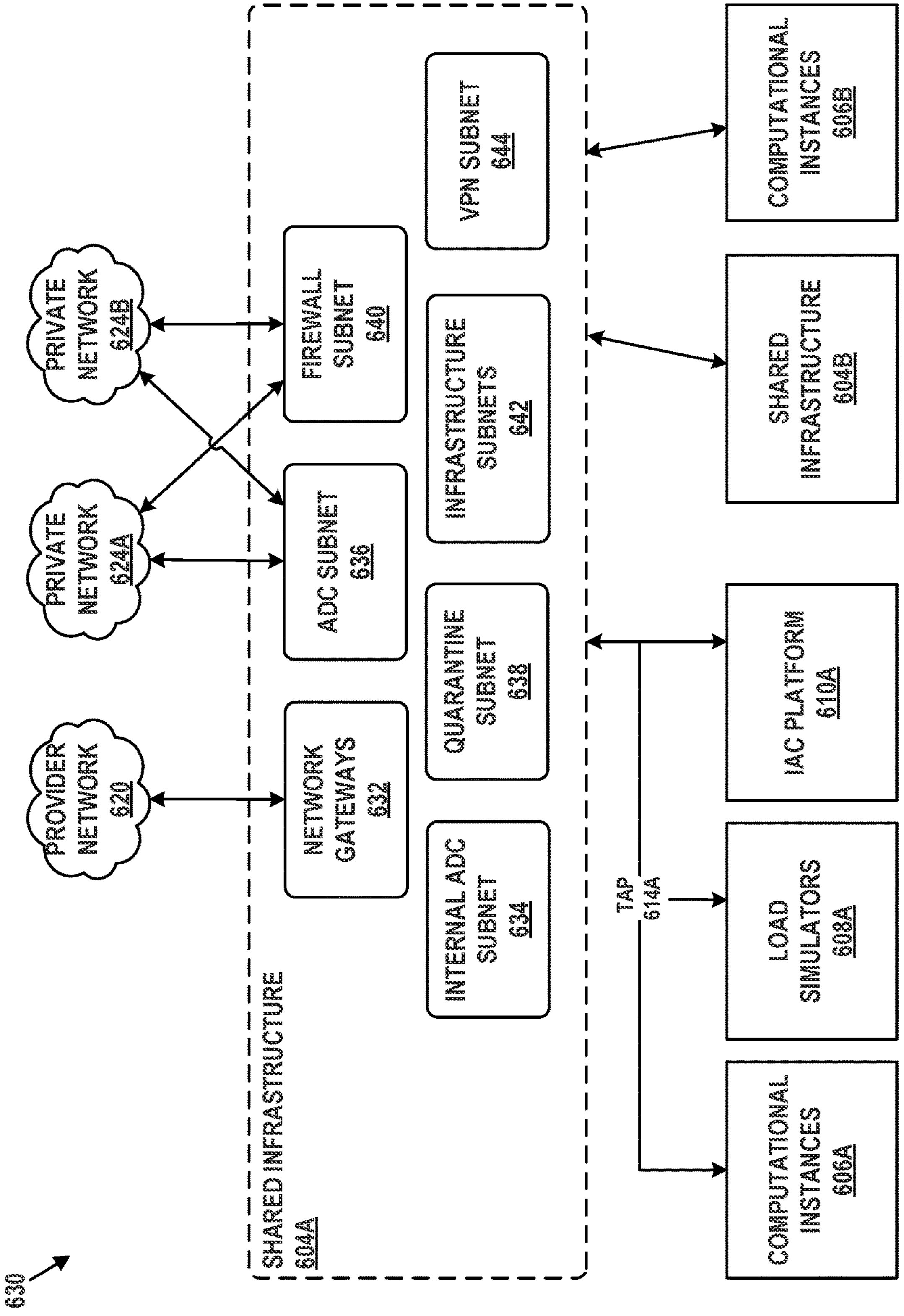
FIG. 6B depicts shared infrastructure for the cloud-based implementation of FIG. 6A, in accordance with example embodiments.

FIG. 6B depicts a detailed diagram 630 of the components of shared infrastructure 604A as well as their connectivity to other entities. Each of the components of shared infrastructure 604A may be able to communicate with one another, but their ability to communicate with components of other subscriptions may be limited.

Network gateways 632 serve as interfaces to provider network 620, private network 624A, private network 624B, and possibly other networks as well. As noted above, the links between network gateways 632 and provider network 620, private network 624A, and private network 624B may be dedicated or virtual. This allows components of shared infrastructure 604A to be able to pull objects (e.g., configurations, software packages, database schema, or updates thereof) into the public cloud implementation. This also allows users from provider network 620 to be able to remotely access the public cloud implementation.

Shared infrastructure 604A also contains two sets of application delivery controller (ADC) subnets, each of which has a load balancing function. Internal ADC subnet 634 balances load within shared infrastructure 604A (e.g., requests for the services within quarantine subnet 638 or infrastructure subnets 642). ADC subnet 636 contain load balancers that balance load to and from each computational instance of computational instances 606A and/or load simulators 608B. In other words, for each set of physical and/or virtual machines (i.e., a pod as described below) carrying out a particular service for a particular managed network, there may be a load balancer in ADC subnet 636 tasked with balancing load between these physical and/or virtual machines. Likewise, for each pod in load simulators 608B, there may be a load balancer in ADC subnet 636 tasked with balancing load between the physical and/or virtual machines thereof.

Quarantine subnet 638 includes one or more server devices on which updates to the configuration, software packages, and database schema deployed within region 602A are temporarily stored for human review. In some situations, an update may have known security vulnerabilities or other flaws that could have a negative impact on the operation or security of components within region 602A. Given the heightened security features of the isolated full-stack deployment, such risks may be acceptable.

To prevent these scenarios, an administrator or qualified agent may assess the risk level of the update and determine whether to approve or reject the update. To make tampering with these risk assessments difficult, it may be required that this individual only perform risk assessments when logged into computing services that operate within quarantine subnet 638.

If the individual approves an update, the quarantine subnet 638 may push the update to a software repository or a destination computing resource within region 602A (i.e., to virtual machines within shared infrastructure 604A, computational instances 606A, load simulators 608A, and/or IAC platform 610A. Advantageously, quarantine subnet 638 reduces the likelihood of deploying harmful updates while simultaneously allowing beneficial updates to be quickly installed.

Firewall subnet 640 may monitor the network traffic between region 602A and private network 624A, as well as between region 602A and private network 624B. Particularly, firewall subnet 640 may permit components within region 602A to reach out to proxy servers within private network 624A and/or private network 624B for purposes of discovery, for example. Further, firewall subnet 640 may permit users of private network 624A and/or private network 624B to create their own custom VPN tunnels into shared infrastructure 604A (e.g., in conjunction with VPN gateway subnet 644). In some cases, firewall subnet 640 may include network address translation modules that modify the headers of packets traversing the firewalls so that these headers are consistent with the IP address spaces of deployment 600 and a corresponding private network. In these or alternative embodiments, the VPN tunnels may be between private network 624A and VPN subnet 644, as well as between private network 624B and VPN subnet 644. In the outbound direction, network access controls may only permit traffic from computational instances 606A and/or computational instances 608A toward private network 624A and private network 624B. Thus, these VPN tunnels may not expose resources within shared infrastructure 604A.

Infrastructure subnets 642 contains core services such as DNS, lightweight directory access protocol (LDAP), and dynamic host configuration protocol (DHCP). Other centralized services used by computational instances may be included in infrastructure subnets 642, such as virus scanning, chart rendering, data analysis, machine learning tools, etc.

VPN gateway subnet 644 allows users from private network 624A and/or private network 624B to remotely log on to shared infrastructure 604A and manage services deployed in region 602A. These services may include those of computational instances 606A and/or load simulators 608A.

Notably, the link between shared infrastructure 604A and computational instances 606A may include tap 614A. This tap copies or mirrors the network traffic traversing the link so that a copy of it is delivered to load simulators 608A. As described below, this allows load simulators 608A to replicate scenarios experienced by computational instances 606A.

2. Computational Instances

Computational instances 606A include applications and databases that, in combination with one another, perform tasks that are the same or similar to those performed by computational instances of remote network management platform 320 (computational instance 322, for example). For example, there may be one or more computational instance dedicated to each private network. As noted previously, computational instances 606A may have connections with shared infrastructure 604A, shared infrastructure 604B, computational instances 606B, and object storage 612A.

Figure 6C:
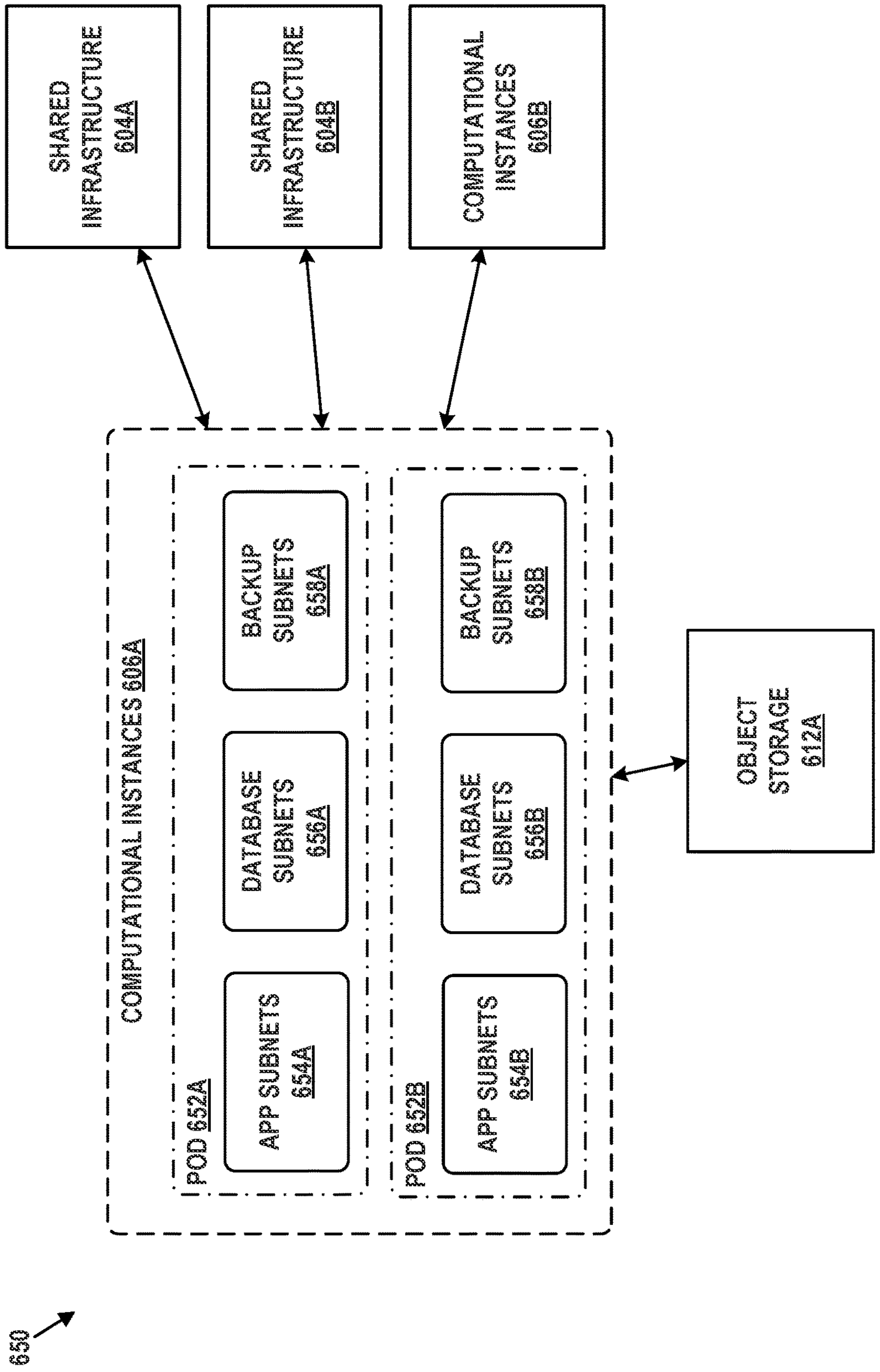
FIG. 6C depicts computational instances for the cloud-based implementation of FIG. 6A, in accordance with example embodiments.

FIG. 6C depicts a detailed diagram 650 of the components of computational instances 606A as well as their connectivity to other entities. Each computational instance may be deployed within a pod, which may otherwise be referred to as a proximity placement group. A pod is a logical arrangement of virtual machines that are to be located within the same data center. This is particularly advantageous when a region spans multiple data centers.

Thus, for example, pod 652A includes app subnets 654A containing application server virtual machines, database subnets 656A containing database server virtual machines, and backup subnets 658A containing backup virtual machines. Likewise, pod 652B includes app subnets 654B containing application server virtual machines, database subnets 656B containing database server virtual machines, and backup subnets 658B containing backup virtual machines. By deploying the servers that make up a computational instance with a single pod, the network traffic between these servers is guaranteed not to leave a single physical data center. As a consequence, the latency experienced by this traffic should remain low.

The terms "pod" and "computational instance" may be used synonymously when it is convenient and proper to do so. For example, there may be a one-to-one mapping between pods and computational instances. While only two pods are shown in FIG. 6C, dozens, hundreds, or thousands of pods may be present within computational instances 606A.

App subnets 654A and database subnets 656A may respectively embody the application nodes and database nodes discussed in the context of FIG. 3. Backup subnets 658A may contain spare computational capacity (e.g., in the form of virtual machines) that can be used should any virtual machine assigned to app subnets 654A or database subnets 656A fail. In some embodiments, backup subnets 658A are a separate network for the transition of backup data from database subnets 656A to object storage 612A. This is a performance consideration to make it so that that backup traffic does not compete with production traffic for network capacity.

Outside of computational instances 606A is object storage 612A. This may include generic public cloud containers that can store unstructured data, such as binary large objects (BLOBs) of MICROSOFT® AZURE®, the cloud file service of GOOGLE® Cloud Platform, and/or S3 of AMAZON WEB SERVICES®. The database servers of database subnets 656A may stream backups of their data into object storage 612A. Database restoration functionality of load simulators 608A may allow this storage data to be cloned into databases therein.

Given these characteristics of computational instances 606A, various data flow paths may be supported. For example, a web page request—such as an HTTPS request—from private network 624A or private network 624B may be routed to firewall subnet 640, where it is allowed through the appropriate firewall. For example, a firewall rule allowing HTTPS requests from a private network to its associated computational instance(s) may be in place. Once through the firewall, the request may traverse ADC subnet 636 and be routed by a load balancer thereof to an appropriate application server in an app subnet for the target computational instance. Once the request is served (e.g., by the application server and a database server from the associated database subnets), a reply containing web page information may be transmitted to the sender. This reply may also be routed through firewall subnet 640, where the same rule allows the reply to traverse the firewall and be transmitted to the appropriate private network.

3. Load Simulators

Load simulators 608A include pods that are configured to receive network traffic between managed networks (e.g., private networks 624A and 624B) and computational instances 606A by way of tap 614A. Load simulators 608A may also be able to obtain database contents from object storage 612A and then replay the received traffic against a configuration of app, database, and backup subnets.

There are multiple reasons for separating load simulators 608A into a subscription and/or pod that is distinct from computational instances 606A. Doing so isolates production activity from load simulation activity, and provides a greater level of control over shared resources in load simulators 608A. In addition, when authorized by the private network on behalf of which a load simulation is being executed, access may be granted to specific engineering personal dedicated to load simulation. This access can be completely isolated to load simulators 608A, and not include access to computational instances 606A.

Figure 6D:
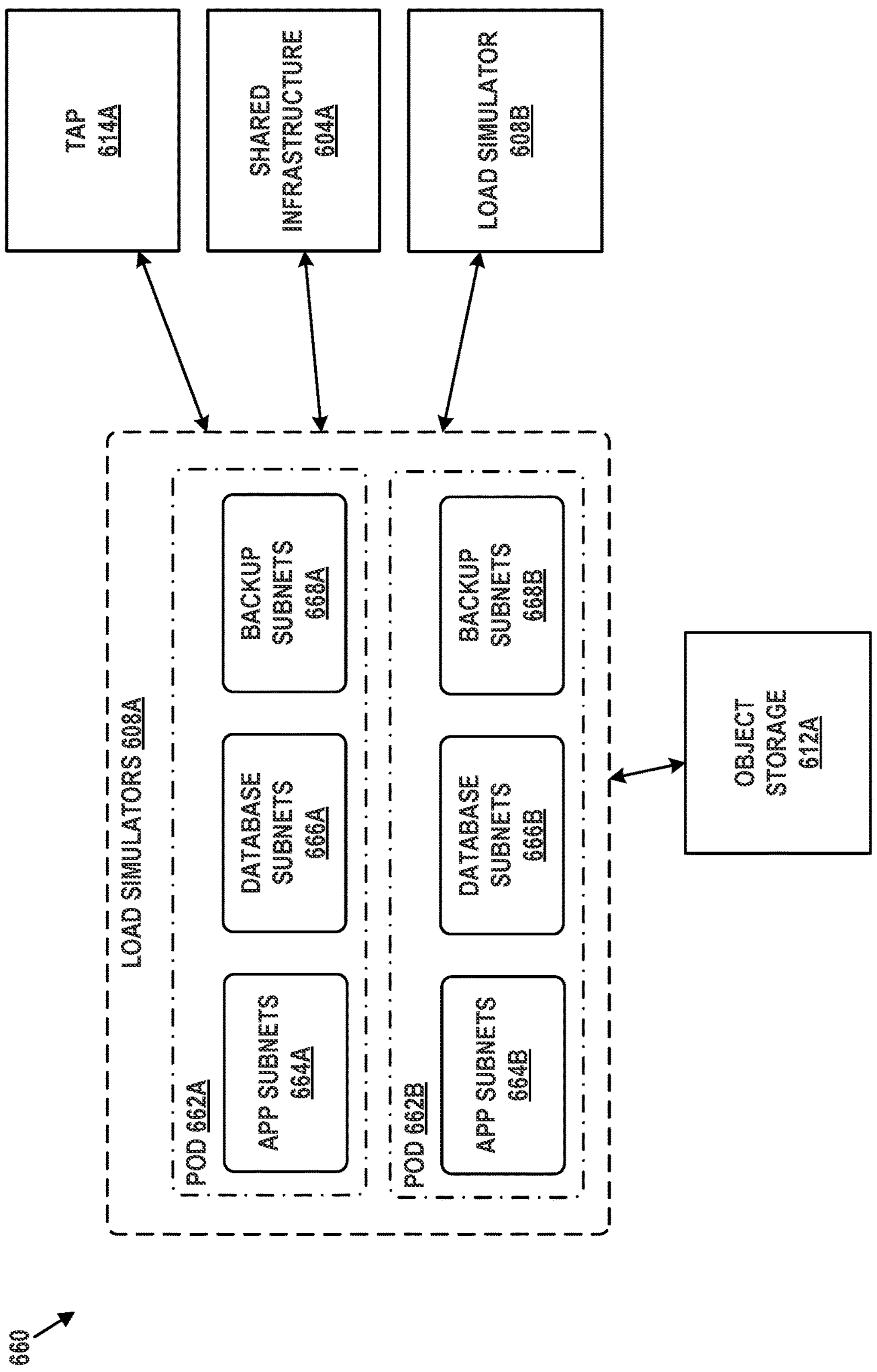
FIG. 6D depicts load simulators for the cloud-based implementation of FIG. 6A, in accordance with example embodiments.

FIG. 6D depicts a detailed diagram 660 of the components of load simulators 608A as well as their connectivity to other entities. Each load simulator may be deployed within a pod, where a pod is defined in the same fashion as it was for computational instances 606A. But, in the context of load simulators 608A, a "pod" may refer to a load simulator arrangement for a particular computational instance. Thus, pod 662A, for example, may contain app subnets 664A, database subnets 666A, and backup subnets 668A that simulate those of pod 652A. Likewise, pod 662B may contain app subnets 664B, database subnets 666B, and backup subnets 668B that simulate those of pod 652B. Load simulators 608A connects to tap 614A, shared infrastructure 604A, load simulators 608B, and object storage 612A.

When tap 614A is activated for a computational instance of computational instances 606A (e.g., with permission of the associated managed network), all traffic to and from the computational instance is copied to a pod within load simulators 608A. This pod need not be persistently dedicated to the computational instance, but may be configured to mirror the configuration of app subnets, database subnets and backup subnets of the computational instance for a period of time.

Notably, this recording may be non-intrusive so that the performance of the computational instance is not adversely impacted. The recording may last anywhere from several seconds to several days (or more), and may be compressed and encoded into representations of transactions. Then, at a later point in time, a load generator may decode the representations and generate network traffic that is used to test a version of the computational instance software configured in load simulators 608A. To do so, some of the servers in the app subnets or database subnets of a pod may be configured to store representations of the recorded traffic, and to be able to generate actual network traffic from these representations.

In this way, the computational instance software is tested with a realistic collection of real-world transactions that provides a meaningfully representative load. Furthermore, behavioral anomalies (such as performance degradations, functionality failures, or crashes), which occurred during the recording phase can be reproduced in the non-production environment. As a result, the computational instance software can be more thoroughly tested than it otherwise would be from conventional techniques. Furthermore, subtle defects that would normally only present themselves in the production environment can be reproduced as needed, debugged, and corrected.

An example data flow for a load simulation operation may occur as follows. Tap 614A may be configured to send a copy of all network traffic involving pod 652A of computational instances 606A to pod 662B of load simulators 608A. A representation of this captured traffic may be stored within pod 662B. Further, during this traffic capture operation, representations of and updates to database subnets 656A may be streamed to object storage 612A.

After traffic capture completes, pod 662B may be configured to playback the traffic. Thus, pod 662B may be configured to mirror the number and configuration of servers in app subnets 654A, database subnets 656A, and backup subnets 658A with app subnets 664B, database subnets 666B, and backup subnets 668B, respectively. As an example, if app subnets 654A has 5 servers, database subnets 656A has 3 servers, and backup subnets 658A has 2 servers, then app subnets 664B may be configured with 5 servers, database subnets 666B may be configured with 3 servers, and backup subnets 668B may be configured with 2 servers. In some cases, one or more additional servers may be configured in app subnets 664B to act as load generators. Moreover, the stored copy of the contents of database subnets 656A may be loaded from object storage 612A into database subnets 666B.

The load simulation can then be run by causing the load generators to play back the captured traffic against the other servers in app subnets 664B. This may cause interactions between app subnets 664B and database subnets 666B, as well as possible failovers to backup subnets 668B. During this playback, the results of the simulation can be stored for later review.

4. IAC Platform

IAC platform 610A includes one or more servers configured to create the arrangement depicted by FIGS. 6A-6D. These servers may be any IAC platform, such as TERRAFORM® for example.

IAC is a paradigm that provides a programmatic way of defining and orchestrating a cloud computing infrastructure through the use of a single source code file (which may be referred to herein as a "template file"). By treating the cloud computing infrastructure as a mutable file, common file maintenance practices may be applied to ensure greater infrastructure consistency. That is, the single source code file may be kept under a version control system to allow auditability, reproducible builds, and testing practices among application developers and system administrators.

In some embodiments, multiple source code files may be used with IAC platform 610A. In other alternatives, rather than using a file to represent a desired state of one or more cloud-based networks, an IAC platform may be configured to interpret command line interface (CLI) or application programming interface (API) commands to update an internal state of the IAC platform. For this reason, in some embodiments, an IAC template file may be referred to as a "template representation."

Thus, IAC platform 610A may enable a provider network 620 to orchestrate computing resources of deployment 600. To do so, IAC platform 610A may utilize entries of a template representation. These entries may be written in a structured data format (e.g., JavaScript Object Notation (JSON) or HASHICORP® configuration language (HCL)) that can be interpreted by IAC platform 610A to represent a desired state of deployment 600.

Each entry may provide specific details about a computing resource (e.g., virtual machines, processors, storage, load balancers, network segments, etc.). These details may take the form of one or more key-value pairs (herein referred to as configurable parameters). An initial step to using the template representation may be to specify information related to public cloud provider on which computing resources are requested. For example, the template representation may contain an entry with the following format:

```
provider "azurerm" {
  version = "=2.0.0"
}
```

In this entry, the "provider" parameter may indicate a specific public cloud provider (in this the case MICROSOFT® AZURE® resource manager, "azurerm") for which computing resources are requested. The "version" parameter may the version of the resource manager with which the template representation is configured to work.

Continuing from the above example, many different types of computing resources may be requested. As such, the template representation may contain an entry with the following format:

```
resource "azurerm_proximity_placement_group" "example" {
  name = "examplePPG"
  location = "West US"
  resource_group_name = "resourceGroup1"
}
```

This entry specifies a computing resource (in this case, a proximity placement group with a name of "example PPG", a location of "West US", and a group name of "resourceGroup I".

A more complex example is found in template file 670 depicted in FIG. 6E. Template file 670 defines a virtual machine to use a network interface. The network interface is defined within a subnet of a virtual network, and the virtual network is part of a resource group. Template file 670 also uses variables to specify the parameters of these resources, with any instance of ${X} representing the variable named "X".

Notably, the entries above and in template file 670 are just illustrations of entries and configurable parameters. Many other types of resources may be managed in a template file, and therefore other examples are possible.

Once the virtual machines, network interfaces, subnets, virtual networks, resource groups, proximity placement group, subscriptions, and various other elements are in place, a higher-layer configuration management tool (e.g., PUPPET®) may deploy operating system and application images to the virtual machines in accordance with their proscribed functionality. For example, an application server may be configured with a particular version of a particular operating system, as well as predetermined versions of numerous software applications and configurations thereof. Likewise, a database server may have a different operating system version and different applications and configuration installed.

B. Full-Stack Deployment

Figure 7A:
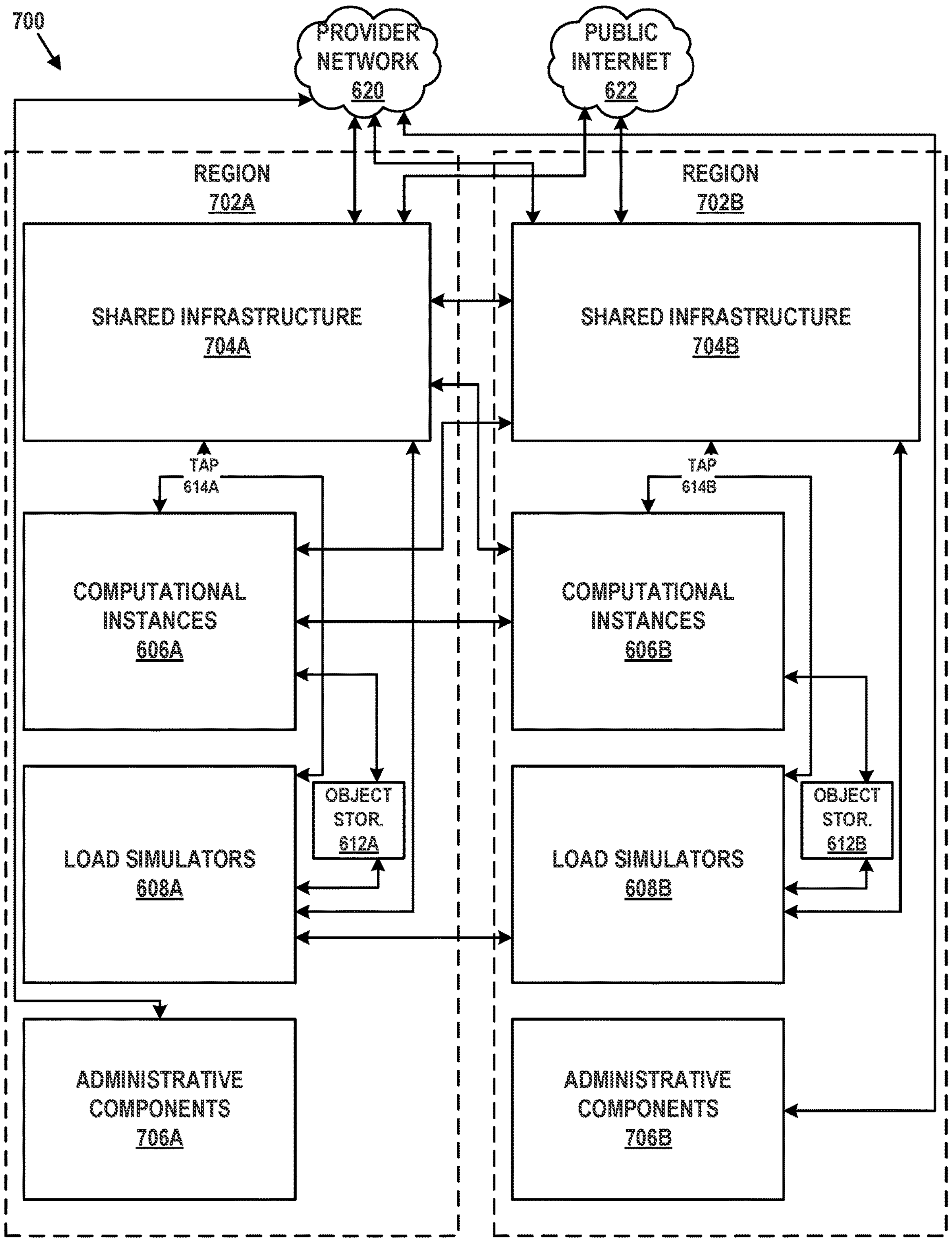
FIG. 7A depicts another cloud-based implementation of a remote network management platform, in accordance with example embodiments.
Figure 7B:
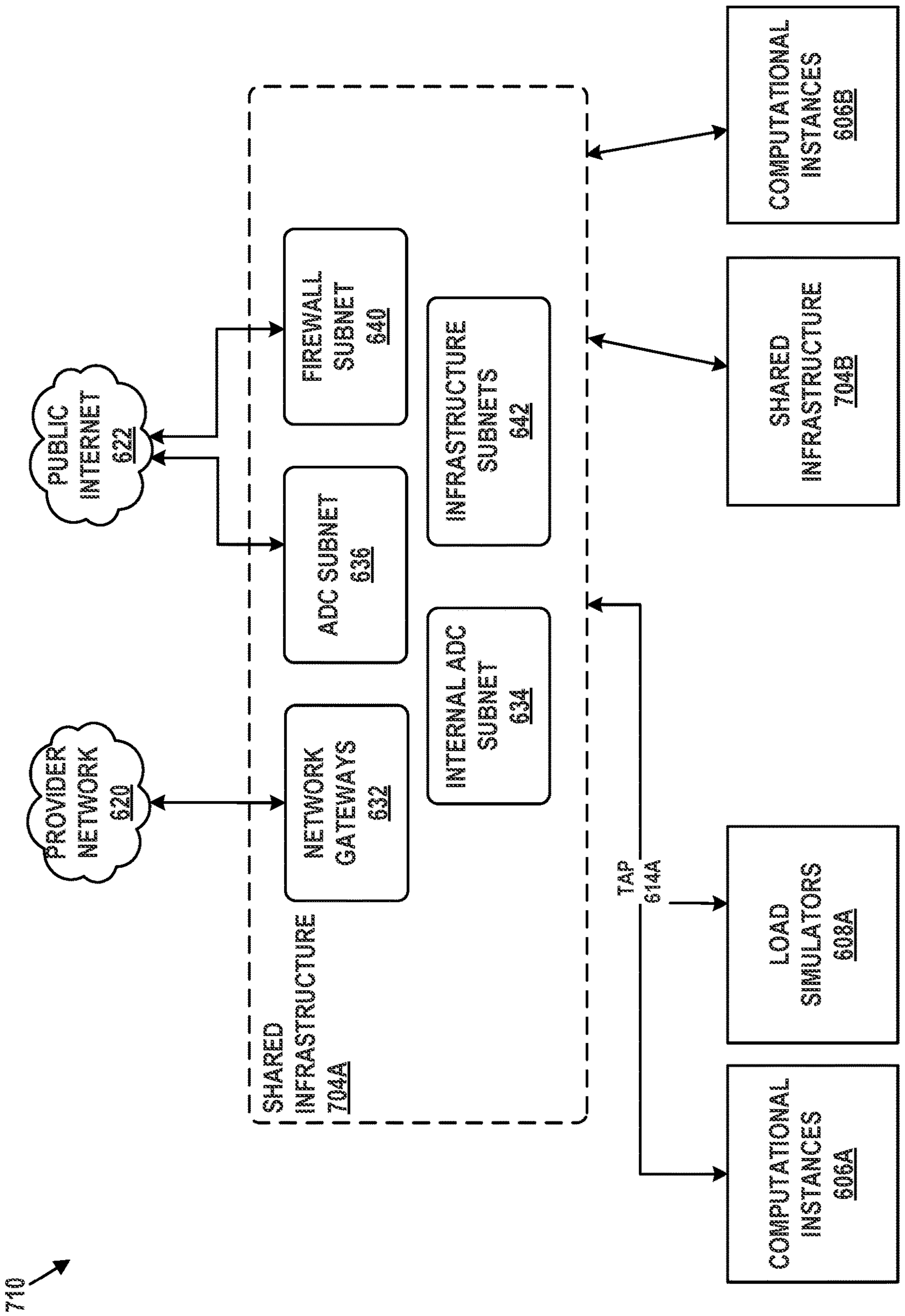
FIG. 7B depicts shared infrastructure for the cloud-based implementation of FIG. 7A, in accordance with example embodiments.
Figure 7C:
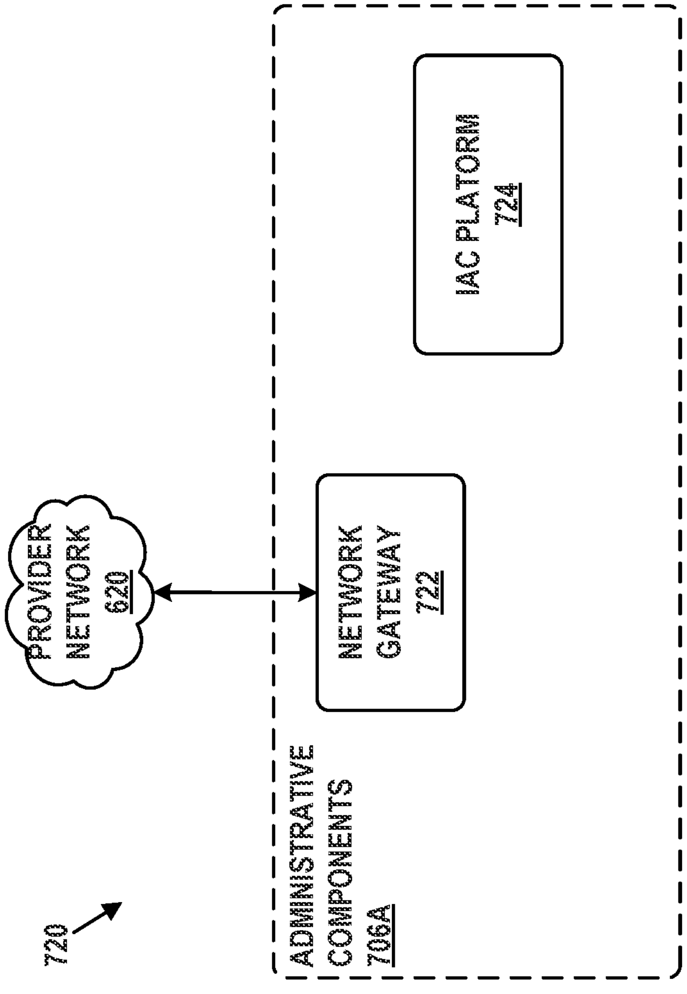
FIG. 7C depicts administrative components for the cloud-based implementation of FIG. 7A, in accordance with example embodiments.

FIGS. 7A-7C illustrate what will be referred to herein as a full-stack deployment. Unlike the isolated full-stack deployment, not all of the technology and services required to host a remote network management platform are contained within the public cloud network. But, the full-stack deployment is intended for general use with managed networks accessible by way of the Internet, and therefore omits certain security mechanisms of the isolated full-stack deployment. Further, the full-stack deployment shares aspects of the control plane across the provider network and the public cloud network, whereas the isolated full-stack deployment almost entirely decouples the control plane of the public cloud network from that of the provider network.

Deployment 700 shown in FIG. 7A consists of a number of logical components distributed across region 702A and region 702B. Unless stated otherwise herein, the components and characteristics of deployment 700 may be identical or similar to corresponding components and functions of deployment 600.

Thus, region 702A contains shared infrastructure 704A, computational instances 606A, load simulators 608A, administrative components 706A, object storage 612A, and tap 614A. Likewise, region 702B contains shared infrastructure 704B, computational instances 606B, load simulators 608B, administrative components 706B, object storage 612B, and tap 614B. Computational instances 606A, load simulators 608A, object storage 612A, tap 614A, computational instances 606B, load simulators 608B, object storage 612B, and tap 614B may be the same or similar to those of deployment 600.

Both regions 702A and 702B may connect to various external networks. For example, FIG. 7A depicts these regions connecting to provider network 620 and public Internet 622. These connections may be dedicated lines, trunks, or circuits, for example. By way of public Internet 622, deployment 700 may serve a number of managed networks.

For sake of simplicity, the description below will focus on the components of region 702A. Nonetheless, the corresponding components of region 702B may have similar functionality.

1. Shared Infrastructure

Shared infrastructure 704A contains security mechanisms and shared services that operate on behalf of other components in region 702A, and provide these components with access to provider network 620 and public Internet 622. Notably, shared infrastructure 704B has connections to provider network 620 and public Internet 622, as well as to computational instances 606A, and load simulators 608A. Shared infrastructure 704A also has connections to shared infrastructure 704B and computational instances 606B for purposes of redundancy, load balancing, and configuration management.

FIG. 7B depicts a detailed diagram 710 of the components of shared infrastructure 704A as well as their connectivity to other entities. Each of the components of shared infrastructure 704A may be able to communicate with one another, but their ability to communicate with components of other subscriptions may be limited.

Notably, network gateways 632, internal ADC subnet 634, ADC subnet 636, firewall subnet 640, and infrastructure subnets 642 are the same or similar to those of shared infrastructure 604A. Their general functionality may be the same but their configurations may differ in some cases. Absent from shared infrastructure 704A is a quarantine subnet and a VPN gateway subnet. These components are not necessary due to the relatively lower security requirements of deployment 700 compared to deployment 600. For example, software images and/or updates may be transmitted from provider network 620 to deployment 700 without being subjected to a quarantine procedure.

2. Computational Instances

Computational instances 606A may be arranged in the same or a similar fashion to that of deployment 600. While some configuration and operational differences may exist between the computational instances of deployment 600 and deployment 700, they generally serve the same or similar functions.

3. Load Simulators

Load simulators 608A may be arranged in the same or a similar fashion to that of deployment 600. While some configuration and operational differences may exist between the load simulators of deployment 600 and deployment 700, they generally serve the same or similar functions.

4. Administrative Components

Diagram 720 is an enhanced version of the IAC platform of deployment 600 with an arrangement tailored for deployment 700. In particular, FIG. 7C depicts administrative components 706A including network gateway 722 and IAC platform 724.

Network gateway 722 connects administrative components 706A (notably, IAC platform 724) to provider network 620. Unlike deployment 600, this deployment allows a more direct connectivity between IAC platform 724 and provider network 620. IAC platform 724 may have the same or similar functionality to that of IAC platform 610A. Thus, IAC platform 724 may be a TERRAFORM® or similar instance that uses one or more template representations to define the cloud computing architecture of deployment 700, for example.

IAC platform 724 can pull (or be pushed) the configuration, software packages, and database schema for components within region 702A without these items traversing shared infrastructure 704A or being subject to a quarantine step. In other words, deployment 600 is standalone, in that provider network 620 can fail without significantly impacting the operations of deployment 600. But deployment 700 involves more communication with and reliance upon provider network 620. Thus, as the configuration, software packages, and database schema for provider network 620 are modified, these modifications may automatically propagate to deployment 700, but not to deployment 600. In deployment 600, the modifications would have to be first approved by the quarantine process.

Further, in deployment 700, each region or group of regions may have its own individual accounts and/or credentials for its respective IAC platform. Thus, should an IAC platform be compromised, the damage that can be done would be limited to a particular region or group of regions.

C. Hybrid Deployment

Figure 8A:
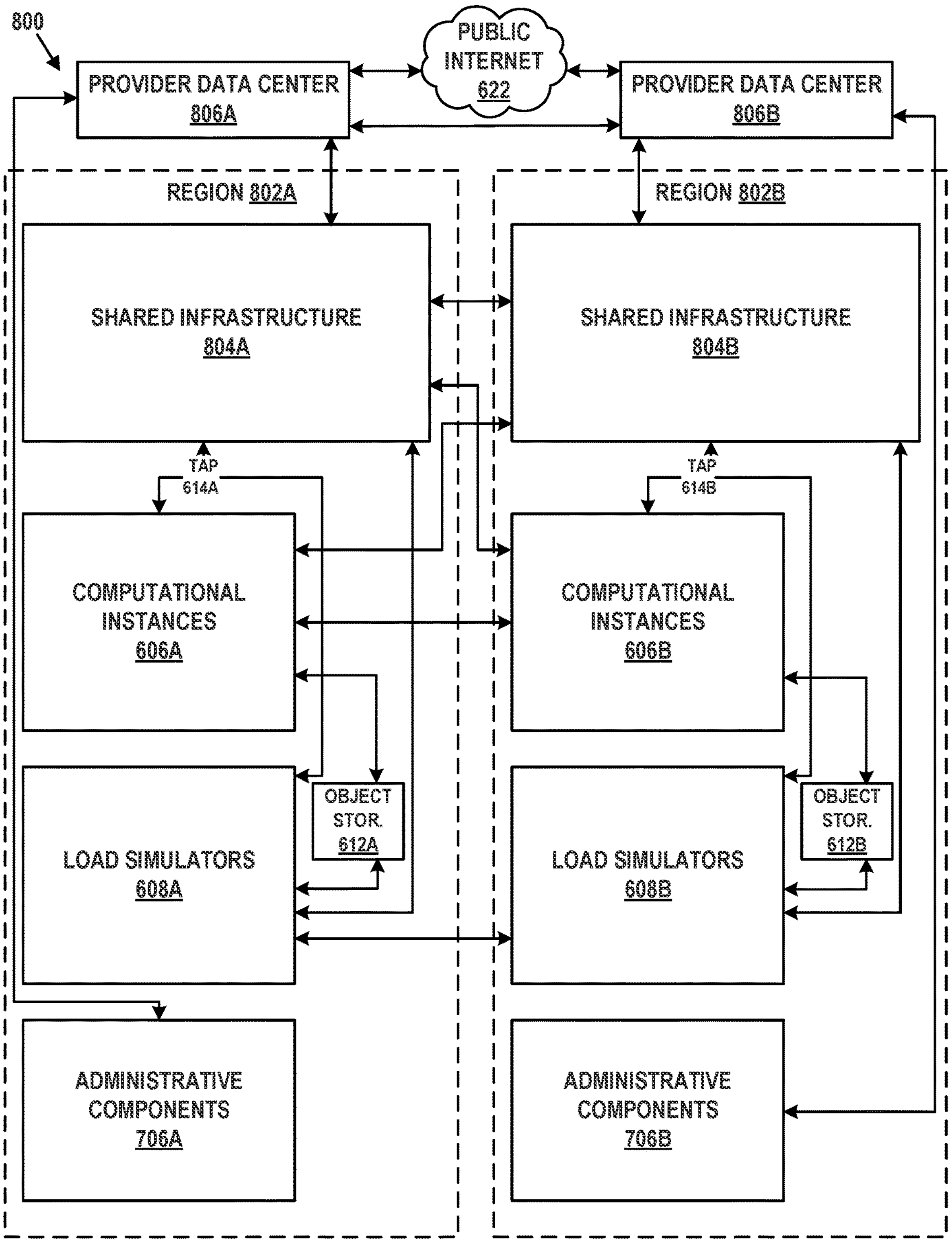
FIG. 8A depicts yet another cloud-based implementation of a remote network management platform, in accordance with example embodiments.
Figure 8B:
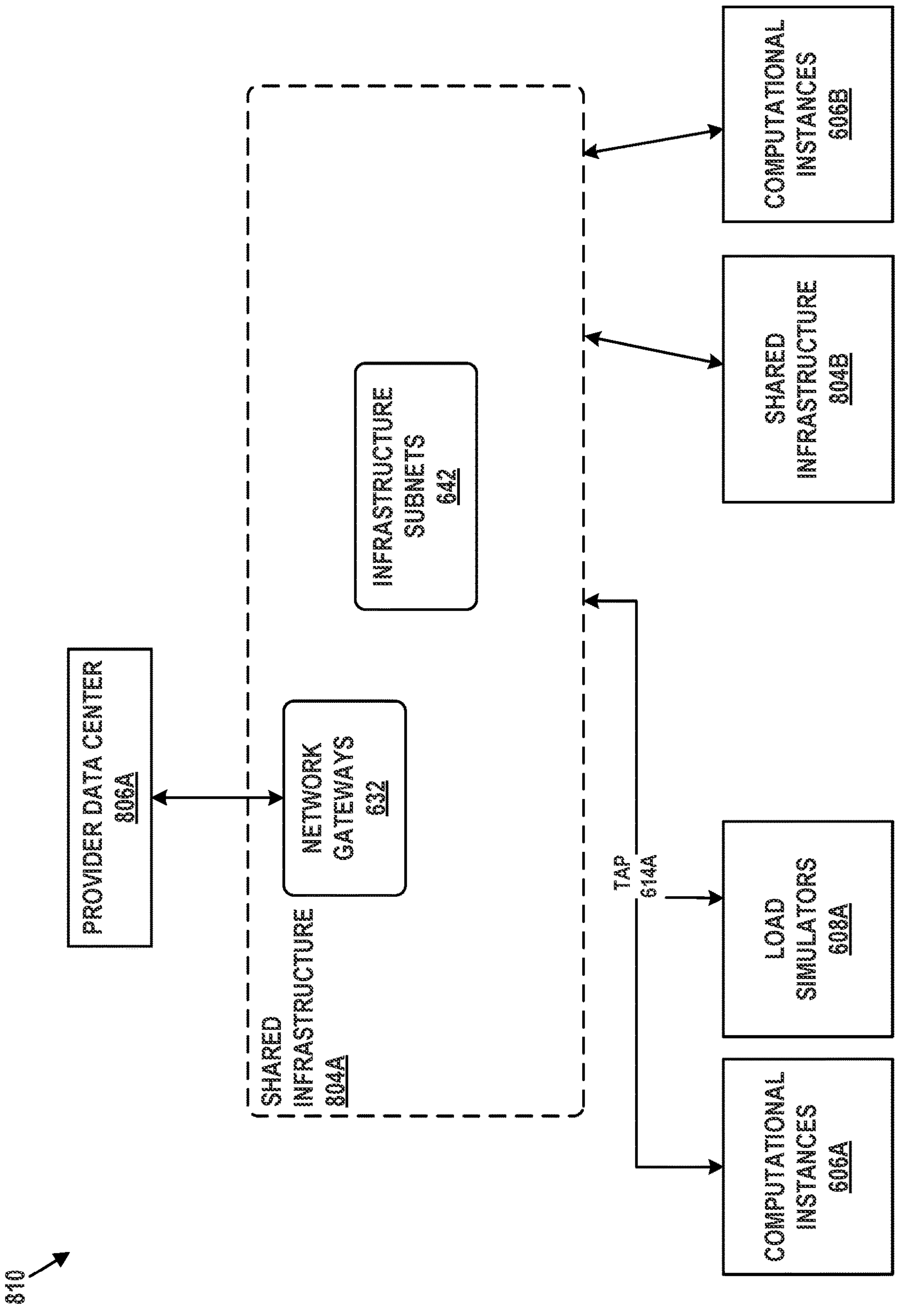
FIG. 8B depicts shared infrastructure for the cloud-based implementation of FIG. 8A, in accordance with example embodiments.
Figure 8C:
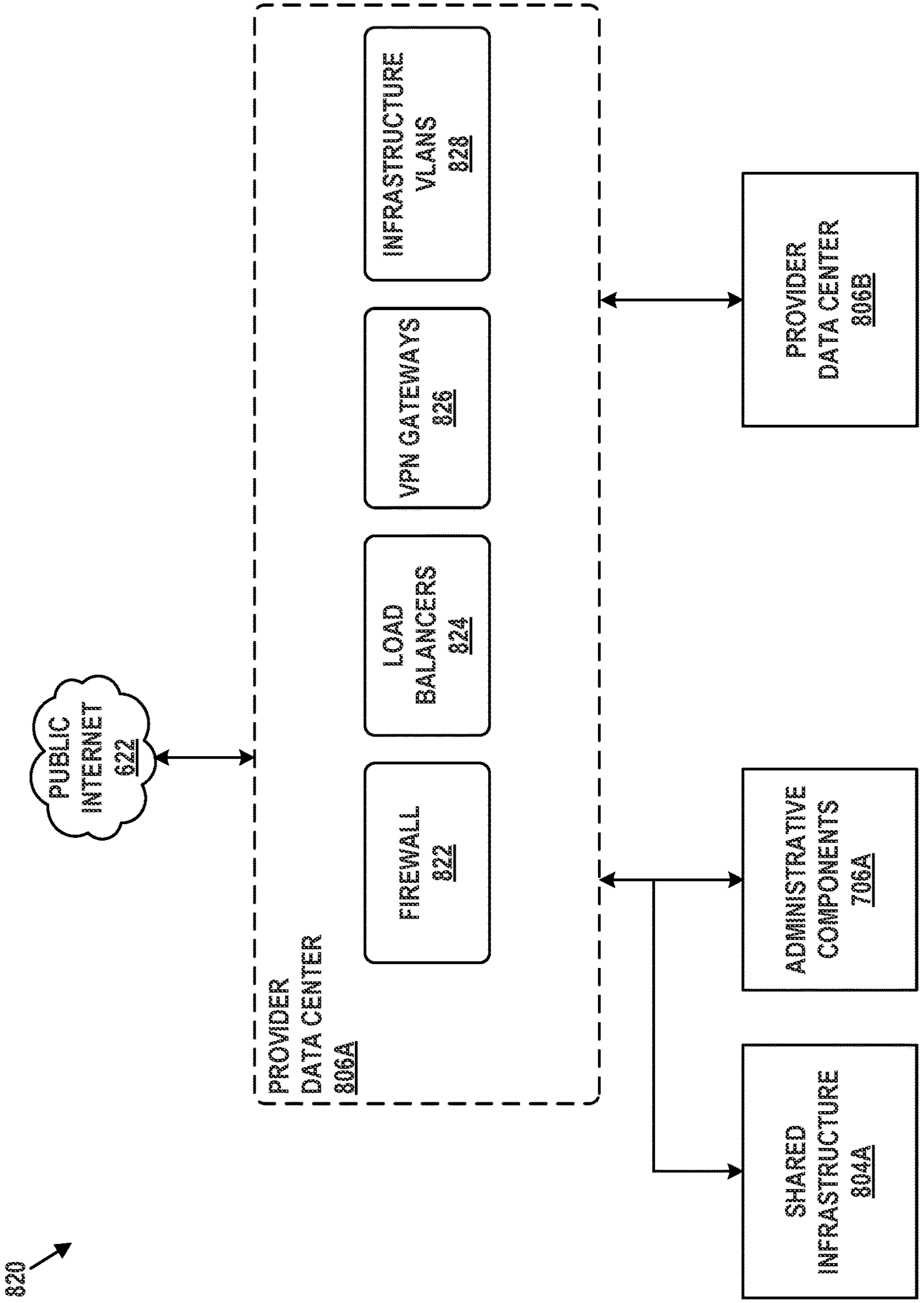
FIG. 8C depicts a provider data center that works in conjunction with the cloud-based implementation of FIG. 8A, in accordance with example embodiments.

FIGS. 8A-8C illustrate what will be referred to herein as a hybrid deployment. Unlike the isolated full-stack and full-stack deployments, the technology and services required to host a remote network management platform is split between a provider data center and the public cloud network. Particularly, the majority of the shared infrastructure is disposed within the provider data center rather than the public cloud network.

The hybrid deployment is targeted at countries or jurisdictions with data sovereignty requirements. By using a public cloud network located within a particular jurisdiction (e.g., the France, Switzerland, the European Union), local data privacy regulations can be met. But the number of components deployed on the public cloud network is reduced, as the shared infrastructure is largely within the provider data center and therefore can be used with multiple public cloud deployments.

Deployment 800 shown in FIG. 8A consists of a number of logical components distributed across region 802A and region 802B. Unless stated otherwise herein, the components and characteristics of deployment 800 may be identical or similar to corresponding components and functions of deployments 600 and/or 700.

Thus, region 802A contains shared infrastructure 804A, computational instances 606A, load simulators 608A, administrative components 706A, object storage 612A, and tap 614A. Likewise, region 802B contains shared infrastructure 804B, computational instances 606B, load simulators 608B, administrative components 706B, object storage 612B, and tap 614B. Computational instances 606A, load simulators 608A, object storage 612A, tap 614A, computational instances 606B, load simulators 608B, object storage 612B, and tap 614B may be the same or similar to those of deployment 600. Administrative components 706A and 706B may be the same or similar to those of deployment 700.

Both regions 802A and 802B may connect to respective provider data centers. For example, FIG. 8A depicts these regions connecting to provider data center 806A and provider data center 806B, and being able access public Internet 622 by way of these data centers. These connections may be dedicated lines, trunks, or circuits, for example. By way of public Internet 622, deployment 800 may serve a number of managed networks. There may also be connectivity to provider network 620 by way of both provider data center 806A and provider data center 806B.

For sake of simplicity, the description below will focus on the components of region 802A. Nonetheless, the corresponding components of region 802B may have similar functionality.

1. Shared Infrastructure

Shared infrastructure 804A contains security mechanisms and shared services that operate on behalf of other components in region 702A, and provide these components with access to provider data center 806A and public Internet 622. Notably, shared infrastructure 804B has connections to provider data center 806A and public Internet 622 by way of provider data center 806A, as well as to computational instances 606A, and load simulators 608A. Shared infrastructure 804A also has connections to shared infrastructure 804B and computational instances 606B for purposes of redundancy, load balancing, and configuration management.

FIG. 8B depicts a detailed diagram 810 of the components of shared infrastructure 804A as well as their connectivity to other entities. Each of the components of shared infrastructure 804A may be able to communicate with one another, but their ability to communicate with components of other subscriptions may be limited.

Notably, infrastructure subnets 642 may be the same or similar to that of shared infrastructure 604A. Its general functionality may be the same but configurations may differ in some cases. An example of a component within infrastructure subnets 642 could be a customer database or an email server containing potentially sensitive data from a privacy perspective. Data sovereignty regulations may require that this data, when at rest, be maintained in a public cloud instance within the local jurisdiction. As noted below, most other shared infrastructure components have been moved to provider data center 806A. Thus, like shared infrastructure 704A, shared infrastructure 804A does not have its own quarantine subnet or VPN gateway subnet.

2. Provider Data Center

Provider data center 806A contains part of the control plane used to manage components disposed within the public cloud network. Thus, as shown in diagram 820 of FIG. 8C, provider data center 806A may include firewall 822, load balancers 824, VPN gateways 826, and infrastructure VLANs 828. Thus, in comparison to deployments 600 and 700, data ingress/egress, load balancing, VPN, and various other functionality has been moved from shared infrastructure within the public cloud network to provider data center 806A. Provider data center 806A may refer to infrastructure of the operators of remote network management platform 320.

Further, provider data center 806A has connections to public Internet 622, as well as to shared infrastructure 804A and administrative components 706A. Provider data center 806A also has a connections provider data center 806B for purposes of redundancy, load balancing, and configuration management.

3. Computational Instances

Computational instances 606A may be arranged in the same or a similar fashion to that of deployment 600. While some configuration and operational differences may exist between the computational instances of deployment 600 and deployment 700, they generally serve the same or similar functions.

4. Load Simulators

Load simulators 608A may be arranged in the same or a similar fashion to that of deployment 600. While some configuration and operational differences may exist between the load simulators of deployment 600 and deployment 700, they generally serve the same or similar functions.

5. Administrative Components

Administrative components 706A may be arranged in the same or a similar fashion to that of deployment 700. While some configuration and operational differences may exist between the administrative components of deployment 700, they generally serve the same or similar functions.

D. Shared Infrastructure Detail and Variations

Figure 9:
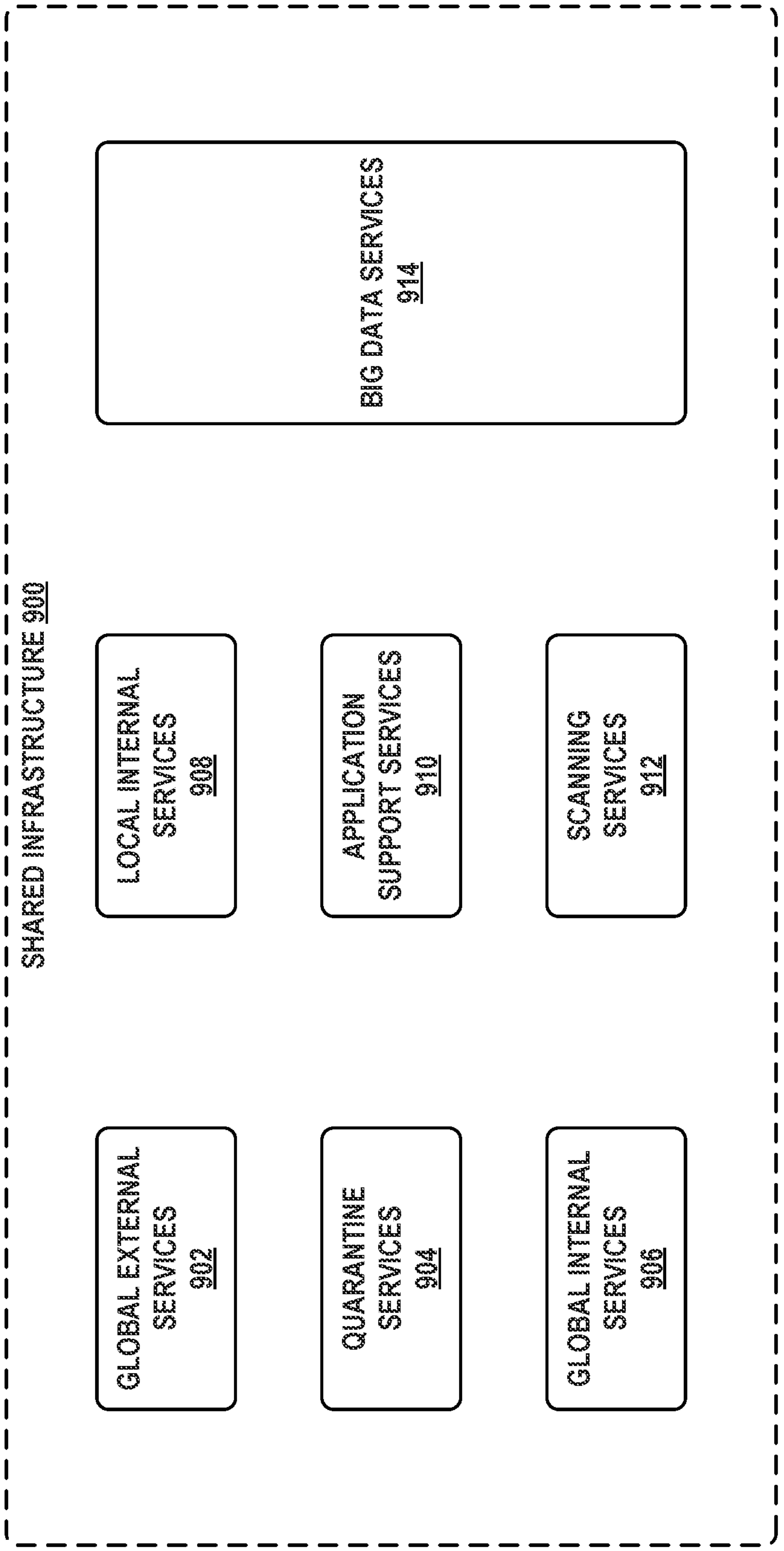
FIG. 9 depicts a more detailed version of the share infrastructure, in accordance with example embodiments.

FIG. 9 provides a greater degree of detail regarding the content of the shared infrastructure services components and how these components might the disposed within different locations based on the type of deployment (e.g., isolated full-stack, full-stack, or hybrid). Notably, shared infrastructure 900 contains global external services 902, quarantine services 904, global internal services 906, local internal services 908, application support services 910, scanning services 912, and big data services 914. Each of these groups of services may be implemented by way of one or more virtual machines, virtual networks, virtual LANs, etc.

Global external services 902 include external-facing services, such as external DNS and email. Here, "external-facing" means that global external services are accessible to client devices outside of the public cloud network.

Quarantine services 904 include systems that are used to move configuration, software packages, and database schema for the public cloud network in and out of the deployment. Thus, quarantine services 904 may include all services and functionality discussed in the context of quarantine subnet 638.

Global internal services 906 include internal-facing services that typically serve more than one region, such as internal DNS, LDAP, machine learning tools, identity and access management tools, content distribution tools, source code and executable image repositories, security certificate authorities, blockchain platforms, etc. Here, "internal-facing" means that these services are accessible to client devices within one or more regions of the public cloud network.

Local internal services 908 include internal-facing services that typically serve only the region in which they are disposed. These may include local internal DNS, LDAP, machine learning tools, source code and executable image repositories, configuration management tools, message brokers, etc.

Application support services 910 include services that other application servers need to connect to in an unusual fashion. For example, application support services 910 may include a data replication platform that stores copies of transactions and logs.

Scanning services 912 include network-level and device-level (virtual or physical) vulnerability detection, intrusion detection, and traffic monitoring services, for example. These services may require a high-level of access to other areas of the region, and therefore are grouped together so that they can be granted appropriate privileges as a set.

Big data services 914 include any service that would otherwise be disposed in a central instance of a remote network management platform. This may be, for example, repositories for specific configurations of computational instances, as well as data that can be shared amongst at least some of the computational instances (e.g., representations of recent security threats).

Unless otherwise stated, shared infrastructure 900 can be considered a more detailed version of shared infrastructure 604A. Thus, FIG. 9 shows shared infrastructure for an isolated full-stack deployment. In full-stack deployments, quarantine services 904 may not exist, and at least some of global external services 902 and/or global internal services 906 may be disposed within provider network 620, for example. In hybrid deployments, most services from local internal services 908, application support services 910, and scanning services 912 are deployed in provider network 620 as well.

VI. Example Operations

Figure 10:
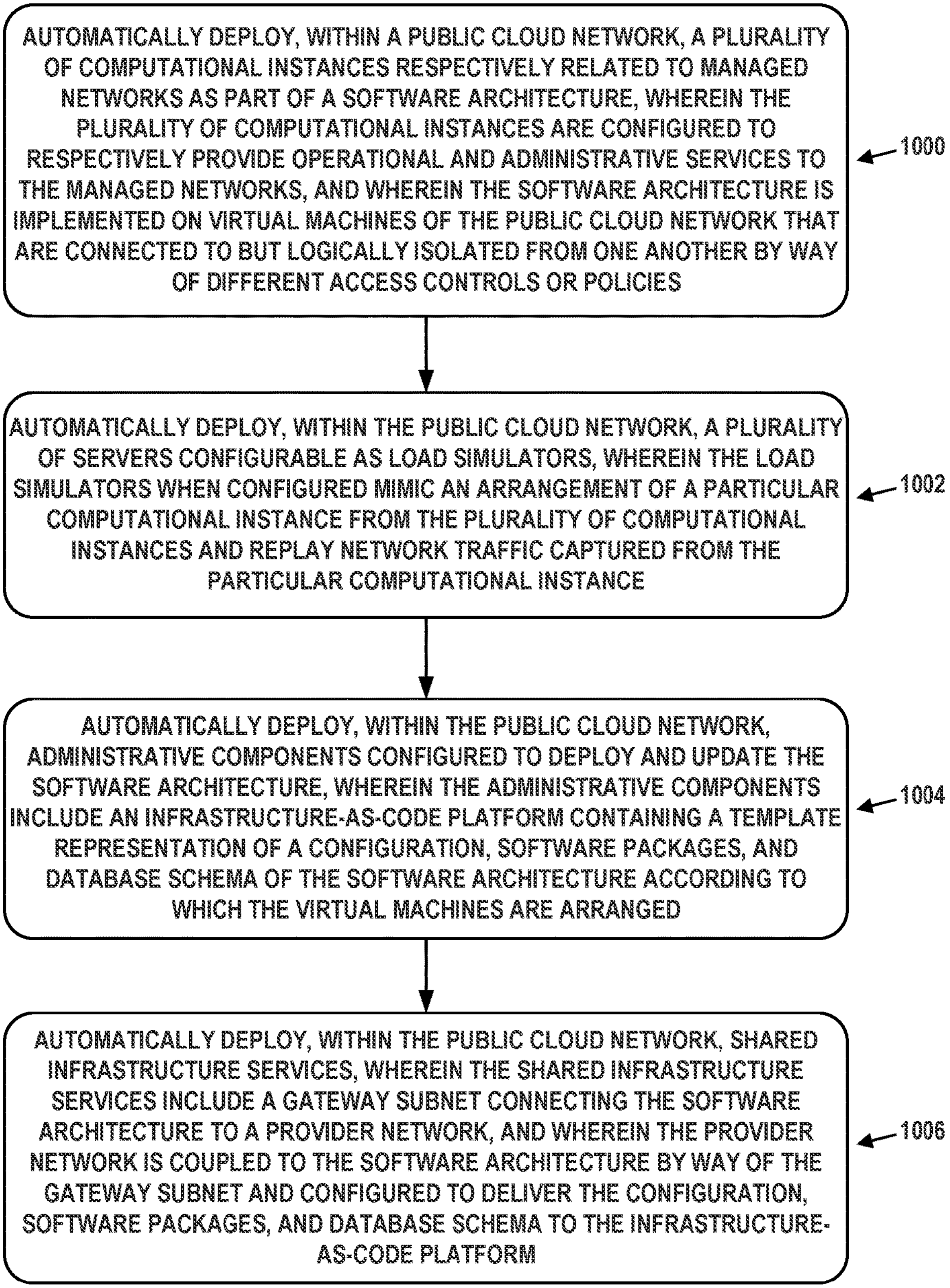
FIG. 10 is a flow chart, in accordance with example embodiments.

FIG. 10 is a flow chart illustrating an example embodiment. The process illustrated by FIG. 10 may be carried out by one or more virtual machines within a public cloud network, for example. However, the process could be carried out by other components.

The embodiments of FIG. 10 may be simplified by the removal of any one or more of the features shown therein. Further, these embodiments may be combined with features, aspects, and/or implementations of any of the previous figures or otherwise described herein.

Block 1000 may involve automatically deploying, within a public cloud network, a plurality of computational instances respectively related to managed networks as part of a software architecture, wherein the plurality of computational instances are configured to respectively provide operational and administrative services to the managed networks, and wherein the software architecture is implemented on virtual machines of the public cloud network that are connected to but logically isolated from one another by way of different access controls or policies.

Block 1002 may involve automatically deploying, within the public cloud network, a plurality of servers configurable as load simulators, wherein the load simulators when configured mimic an arrangement of a particular computational instance from the plurality of computational instances and replay network traffic captured from the particular computational instance.

Block 1004 may involve automatically deploying, within the public cloud network, administrative components configured to deploy and update the software architecture, wherein the administrative components include an infrastructure-as-code platform containing a template representation of a configuration, software packages, and database schema of the software architecture according to which the virtual machines are arranged.

Block 1006 may involve automatically deploying, within the public cloud network, shared infrastructure services, wherein the shared infrastructure services include network gateways connecting the software architecture to a provider network, and wherein the provider network is coupled to the software architecture by way of the network gateways and configured to deliver the configuration, software packages, and database schema to the infrastructure-as-code platform.

In some embodiments, each of the plurality of computational instances respectively include a plurality of database servers containing data related to a corresponding managed network and a plurality of application servers that use the data to provide the operational and administrative services to the corresponding managed network.

Some embodiments may further involve automatically deploying, within the public cloud network, a network tap coupled to a connection between the plurality of computational instances and the shared infrastructure services, wherein the network tap is configured to capture the network traffic from the particular computational instance and provide it to the load simulators.

Some embodiments may further involve automatically deploying, within the public cloud network, unstructured data storage configured to receive streamed backups of data from the plurality of computational instances and to provide the backups of the data to the load simulators.

In some embodiments, the plurality of computational instances, the plurality of servers, the administrative components, and the shared infrastructure services are logically isolated from one another by each having different respective userids and security credentials through which they are accessed.

In some embodiments, the software architecture is deployed within a first geographical region of the public cloud network, wherein the software architecture is paired to a second software architecture deployed within a second geographical region of the public cloud network, wherein the second software architecture includes a second plurality of computational instances corresponding to the plurality of computational instances, a second plurality of servers corresponding to the plurality of servers, second administrative components corresponding to the administrative components, and second shared infrastructure services corresponding to the shared infrastructure services.

In some embodiments, load is balanced between the software architecture and the second software architecture so that (i) approximately 50 percent of the load is served by each of the software architecture and the second software architecture, (ii) each of the managed networks has a corresponding computational instance in exactly one of the software architecture or the second software architecture, and (iii) functionality of the software architecture can fail over to the second software architecture and vice versa.

In some embodiments, the software architecture is an isolated full-stack deployment, wherein the shared infrastructure services also connect to one or more private networks, wherein the shared infrastructure services also include a first set of load balancers configured to balance load amongst servers providing the shared infrastructure services, wherein the shared infrastructure services also include a second set of load balancers configured to balance network traffic inbound from the one or more private networks across servers within a corresponding computational instance, wherein the shared infrastructure services also include a firewall subnet configured to filter the network traffic inbound from the one or more private networks based on predetermined security policies, and wherein the shared infrastructure services also include a virtual private network subnet configured to allow remote access to the software architecture from the one or more private networks.

In the embodiments, the shared infrastructure services may also include domain name system, lightweight directory access protocol, virus scanning, chart rendering, or machine learning services accessible to the plurality of computational instances. Further, the shared infrastructure services also include one or more quarantine servers that are configured to receive the configuration, software packages, and database schema from the provider network, store the configuration, software packages, and database schema for manual approval, and provide the configuration, software packages, and database schema to the administrative components after receipt of the manual approval.

In some embodiments, the software architecture is a full-stack deployment, wherein the shared infrastructure services also connect to a public Internet, wherein the administrative components connect to the provider network, wherein external-facing services of the software architecture and internal-facing services for multiple regions of the software architecture are deployed within the provider network, and wherein internal-facing services for a single region of the software architecture are deployed within the shared infrastructure services.

In some embodiments, the software architecture is a hybrid deployment, wherein the shared infrastructure services connect to a provider data center of the provider network that is in a common geographical region with the software architecture, wherein the shared infrastructure services and the administrative components access a public Internet by way of the provider data center.

In some embodiments, at least some of the plurality of computational instances, plurality of servers, or the shared infrastructure services are automatically deployed by the infrastructure-as-code platform.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

utilizing, by a provider network, a plurality of computational instances deployed within a public cloud network to respectively provide operational and administrative services to a plurality of managed networks;

utilizing, by the provider network, shared infrastructure services hosted in the public cloud network for the plurality of managed networks, wherein the shared infrastructure services utilize network gateways connecting the shared infrastructure services to the provider network; and utilizing, by the provider network, an infrastructure as a code (IAC) platform deployed within the public cloud network to enable the provider network to orchestrate computing resources deployed in the public cloud network for the plurality of managed networks, wherein the provider network, the public cloud network, and the plurality of managed networks are different from each other, and wherein the plurality of managed networks receive the shared infrastructure services hosted in the public cloud network from the provider network via respective dedicated connections.

2. The computer-implemented method of claim 1, comprising:

utilizing, by the provider network, a plurality of network taps deployed within the public cloud network to copy network traffic between the plurality of managed networks and the plurality of computational instances and deliver the network traffic to a plurality of load simulators deployed in the public cloud network.

3. The computer-implemented method of claim 1, comprising:

utilizing, by the provider network, a plurality of load simulators deployed in the public cloud network to receive network traffic between the plurality of managed networks and the plurality of computational instances.

4. The computer-implemented method of claim 3, comprising:

utilizing, by the provider network, a plurality of object storages deployed within the public cloud network to store backup data for the plurality of computational instances.

5. The computer-implemented method of claim 4, wherein the plurality of object storages comprise public cloud containers.

6. The computer-implemented method of claim 4, wherein the plurality of load simulators are configured to clone the backup data.

7. The computer-implemented method of claim 1, wherein the shared infrastructure services utilize a provider data center of the provider network and access a public internet via the provider data center.

8. The computer-implemented method of claim 1, wherein the respective dedicated connections are not provided by the public cloud network.

9. A system, comprising:

a plurality of computational instances, deployed in a public cloud network and utilized by a provider network to respectively provide operational and administrative services to a plurality of managed networks;

shared infrastructure services, hosted in the public cloud network and utilized by the provider network to provide shared services to the plurality of managed networks, wherein the shared infrastructure services utilize network gateways connecting the shared infrastructure services to the provider network; and an infrastructure as a code (IAC) platform, deployed in the public cloud network and utilized by the provider network to orchestrate computing resources deployed in the public cloud network for the plurality of managed networks, wherein the provider network, the public cloud network, and the plurality of managed networks are different from each other, and wherein the plurality of managed networks receive the shared infrastructure services hosted in the public cloud network from the provider network via respective dedicated connections.

10. The system of claim 9, comprising:

a plurality of network taps configured to copy network traffic between the plurality of managed networks and the plurality of computational instances and deliver the network traffic to a plurality of load simulators deployed in the public cloud network.

11. The system of claim 9, comprising:

a plurality of load simulators, deployed in the public cloud network and configured to receive network traffic between the plurality of managed networks and the plurality of computational instances.

12. The system of claim 11, comprising:

a plurality of object storages configured to store backup data for the plurality of computational instances.

13. The system of claim 12, wherein the plurality of object storages comprises public cloud containers.

14. The system of claim 12, wherein the plurality of load simulators are configured to clone the backup data.

15. The system of claim 9, wherein the system comprises a plurality of regions disposed in different geographical locations, wherein each region of the plurality of regions comprises at least one of the shared infrastructure services and at least one computational instance of the plurality of computational instances.

16. The system of claim 15, wherein at least one of the plurality of regions stores replicated copies of software and data and is configured to be accessible when at least one region of the plurality of regions becomes inaccessible.

17. A tangible, non-transitory computer readable storage media storing instructions that, when executed by one or more processors, cause the one or more processors to perform functions comprising:

utilizing, by a provider network, a plurality of computational instances deployed within a public cloud network to respectively provide operational and administrative services to a plurality of managed networks, wherein the provider network is different from the public cloud network;

utilizing, by the provider network, shared infrastructure services hosted in the public cloud network to provide shared services to the plurality of managed networks, wherein the shared infrastructure services utilize network gateways connecting the shared infrastructure services to the provider network; and utilizing, by the provider network, an infrastructure as a code (IAC) platform deployed within the public cloud network to enable the provider network to orchestrate computing resources deployed in the public cloud network for the plurality of managed networks, wherein the provider network, the public cloud network, and the plurality of managed networks are different from each other, and wherein the plurality of managed networks receive the shared infrastructure services hosted in the public cloud network from the provider network via respective dedicated connections.

18. The non-transitory computer readable storage media of claim 17, wherein the functions comprise:

utilizing, by the provider network, a plurality of load simulators deployed in the public cloud network to receive network traffic between the plurality of managed networks and the plurality of computational instances.

19. The non-transitory computer readable storage media of claim 17, wherein the functions comprise:

utilizing, by the provider network, a plurality of object storages deployed within the public cloud network to store backup data for the plurality of computational instances.

20. The non-transitory computer readable storage media of claim 19, wherein the plurality of object storages comprise public cloud containers.

* * * * *